United States Patent
Czanta et al.

(10) Patent No.: US 9,611,428 B2
(45) Date of Patent: *Apr. 4, 2017

(54) LIQUID-CRYSTALLINE MEDIUM AND ELECTRO-OPTICAL LIQUID-CRYSTAL DISPLAY

(71) Applicant: Merck Patent GmbH, Darmstadt (DE)

(72) Inventors: Markus Czanta, Darmstadt (DE); Harald Hirschmann, Darmstadt (DE); Izumi Saito, Darmstadt (DE); Volker Reiffenrath, Rossdorf (DE); Lars Lietzau, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 81 days.

This patent is subject to a terminal disclaimer.

(21) Appl. No.: 14/436,988

(22) PCT Filed: Oct. 4, 2013

(86) PCT No.: PCT/EP2013/002999
§ 371 (c)(1),
(2) Date: Apr. 20, 2015

(87) PCT Pub. No.: WO2014/063780
PCT Pub. Date: May 1, 2014

(65) Prior Publication Data
US 2015/0284635 A1    Oct. 8, 2015

(30) Foreign Application Priority Data
Oct. 25, 2012    (DE) .................. 10 2012 020 939

(51) Int. Cl.
| | | |
|---|---|---|
| G02F 1/1333 | (2006.01) |
| C09K 19/34 | (2006.01) |
| C09K 19/42 | (2006.01) |
| C09K 19/44 | (2006.01) |
| C09K 19/56 | (2006.01) |
| C09K 19/04 | (2006.01) |
| C09K 19/12 | (2006.01) |
| C09K 19/30 | (2006.01) |

(52) U.S. Cl.
CPC .......... *C09K 19/3402* (2013.01); *C09K 19/42* (2013.01); *C09K 19/44* (2013.01); *C09K 19/56* (2013.01); *C09K 2019/0466* (2013.01); *C09K 2019/123* (2013.01); *C09K 2019/301* (2013.01); *C09K 2019/3422* (2013.01)

(58) Field of Classification Search
CPC .... C09K 19/3402; C09K 19/42; C09K 19/44; C09K 19/56; C09K 2019/0466; C09K 2019/123; C09K 2019/301; C09K 2019/3422; G02F 1/1333
USPC ............. 252/299.01, 299.6, 299.61; 349/182
See application file for complete search history.

(56) References Cited

U.S. PATENT DOCUMENTS

| | | |
|---|---|---|
| 8,435,423 B2 | 5/2013 | Fujita |
| 8,574,456 B2 | 11/2013 | Wittek et al. |
| 8,715,527 B2 | 5/2014 | Luessem et al. |
| 8,834,744 B2 | 9/2014 | Wittek et al. |
| 2011/0001089 A1 | 1/2011 | Wittek et al. |
| 2011/0042615 A1 | 2/2011 | Luessem et al. |
| 2011/0127465 A1 | 6/2011 | Fujita |
| 2013/0037745 A1 | 2/2013 | Hung et al. |
| 2013/0207038 A1 | 8/2013 | Haensel et al. |
| 2013/0256596 A1 | 10/2013 | Hirschmann et al. |
| 2013/0327984 A1 | 12/2013 | Wittek et al. |

FOREIGN PATENT DOCUMENTS

| | | |
|---|---|---|
| DE | 102008062858 A1 | 7/2009 |
| DE | 102009009414 A1 | 8/2009 |
| EP | 2557140 A2 | 2/2013 |
| EP | 2628779 A2 | 8/2013 |
| WO | 2012079676 A1 | 6/2012 |
| WO | 2013182271 A1 | 12/2013 |

OTHER PUBLICATIONS

International Search Report from PCT Application No. PCT/EP2013/002999 dated Nov. 19, 2013.

*Primary Examiner* — Geraldina Visconti
(74) *Attorney, Agent, or Firm* — Millen White Zelano and Branigan, PC; Csaba Henter; Anthony Zelano

(57) ABSTRACT

The invention relates to an electro-optical liquid-crystal display having a re-alignment layer for the re-alignment of the liquid crystals whose field has a component, crucial for the re-alignment, parallel to the liquid-crystal layer, containing a liquid-crystalline medium, characterized in that it contains at least one compound of the formula (I), at least one compound of the formula (II), and at least one compound of the formula (III), in which the parameters $R^{11}$ to $R^{31}$, $X^{11}$ and $X^{21}$ have the meanings indicated in Claim 1.

9 Claims, No Drawings

LIQUID-CRYSTALLINE MEDIUM AND ELECTRO-OPTICAL LIQUID-CRYSTAL DISPLAY

The invention relates to an electro-optical liquid-crystal display having a re-alignment layer for the re-alignment of the liquid crystals whose field has a component, crucial for the re-alignment, parallel to the liquid-crystal layer, containing a liquid-crystalline medium, characterised in that it contains at least one compound of the formula I,

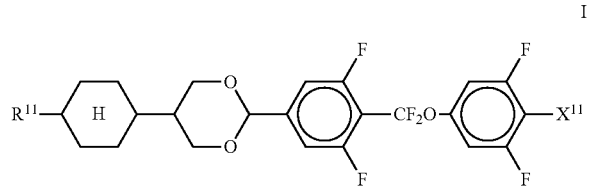

at least one compound of the formula II,

and at least one compound of the formula III,

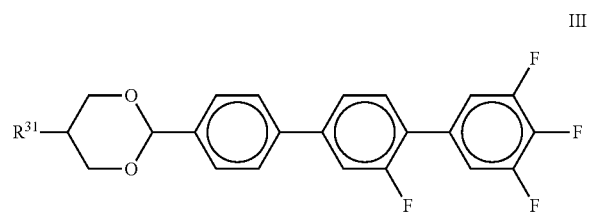

in which the parameters $R^{11}$ to $R^{31}$, $X^{11}$ and $X^{21}$ each have the meaning indicated in claim 1.

In conventional liquid-crystal displays (TN, STN, OMI, AMD-TN), the electric fields for re-alignment are generated essentially perpendicular to the liquid-crystal layer.

International Patent Application WO 91/10936 discloses a liquid-crystal display in which the electric signals are generated in such a way that the electric fields have a significant component parallel to the liquid-crystal layer (IPS, in-plane switching). The principles of operating such a display are described, for example, by R. A. Soref in Journal of Applied Physics, Vol. 45, No. 12, pp. 5466-5468 (1974).

EP 0 588 568, for example, discloses various possibilities for the design of the electrodes and for addressing such a display. DE 198 24 137 likewise describes various embodiments of such IPS displays.

Liquid-crystalline materials for IPS displays of this type are described, for example, in DE 195 28 104.

Typical applications of in-plane switching (IPS) and fringe field switching (FFS) technologies are monitors, notebooks, televisions, mobile telephones, tablet PCs, and many further applications known to the person skilled in the art which are not explicitly enumerated here.

Both the IPS and also the FFS technology have a broad viewing angle compared with other LCD technologies, such as, for example, the vertical alignment (VA) technology. However, the IPS and FFS technologies known to date have the disadvantage of a limited black state and limited light transmission.

For this reason, the provision of further liquid-crystalline media and the use thereof in a display having high transmission, a good black state and a high contrast ratio is a central challenge for modern IPS and FFS applications. In addition, modern applications also require good low-temperature stability and fast addressing times.

At present, there are different technical concepts for achieving high transmission, a dark black state and/or a high contrast ratio, which are described in detail.

A good black state can be achieved through low light scattering of the liquid-crystalline medium. Suitable media must therefore have relatively high elastic constants and preferably a suitable Δn taking into account the switching time requirements.

Since these requirements of the liquid-crystalline medium have hitherto been accompanied by an increase in the rotational viscosity and/or greatly reduced low-temperature stability, further liquid-crystalline media are necessary which have a suitable Δn and relatively high elastic constants at the same time as low rotational viscosities and good low-temperature stabilities.

The transmission of an IPS display can be positively influenced by an increased electrode separation in combination with a smaller electrode width. However, an increased electrode separation requires a higher dielectric anisotropy of the medium in order to keep the operating voltage at the same level. However, a high dielectric anisotropy has to date also implied a high rotational viscosity and/or greatly restricted low-temperature stability. In addition, a higher dielectric anisotropy may result in low elastic constants, which reduce the black state and the reaction time. Furthermore, a significant increase in the elastic constants results in an improvement in the black state and in a reduction in the low-temperature stability.

Liquid-crystalline media having high dielectric anisotropy in combination with simultaneously high elastic constants, low rotational viscosity and good low-temperature stabilities are therefore necessary.

A high contrast ratio can be achieved through a good black state and/or high transmission. Both above-mentioned approaches, including the corresponding of the following requirements of the liquid-crystalline medium, are therefore desirable for optimised contrast of the IPS display:
  suitable values for n and/or
  high elastic constants and/or
  comparatively high values for dielectric anisotropy,
  low values for the rotational viscosity with a view to achieving fast response times, and
  good low-temperature stability In the case of FFS displays, the following analogous requirements arise:
  suitable values for Δn and/or
  high elastic constants and/or
  low values for the rotational viscosity with a view to achieving fast response times, and
  good low-temperature stability Comparatively high values for dielectric anisotropy are often unnecessary in the case of FFS displays, since an increase in the electrode separation only results in increased transmission to a limited extent here. In general, however, the similar requirements mentioned of a liquid-crystalline medium also apply to FFS displays.

These requirements are surprisingly met, preferably simultaneously, through the use of a liquid-crystalline medium which comprises at least one compound of the formula I, at least one compound of the formula II and at least one compound of the formula III.

The invention therefore relates to a liquid-crystalline medium having positive dielectric anisotropy, where the medium is characterised in that it comprises at least one compound of the formula I,

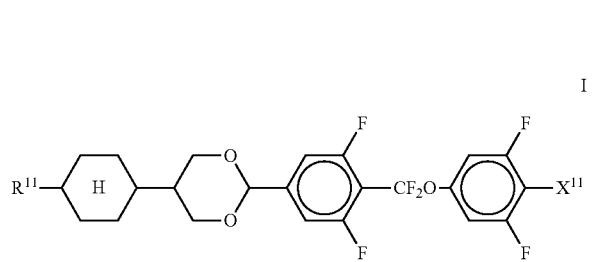

I in which $R^{11}$ denotes an unsubstituted alkyl radical having 1 to 15 C atoms, where, in addition, one or more $CH_2$ groups in this radical may each be replaced, independently of one another, by —C≡C—, —CH═CH—, —CF═CF—, —CF═CH—, —CH═CF—, —(CO)O—, —O(CO)—, —(CO)— or —O— in such a way that O atoms are not linked directly to one another, preferably a straight-chain alkyl radical having 2 to 7 C atoms, and $X^{11}$ denotes F, Cl, CN or an alkyl radical having 1 to 15 C atoms which is mono- or polysubstituted by F, where, in addition, one or more $CH_2$ groups in this radical may each be replaced, independently of one another, by —C≡C—, —CH═CH—, —CF═CF—, —CF═CH—, —CH═CF—, —(CO)O—, —O(CO)—, —(CO)— or —O— in such a way that O atoms are not linked directly to one another, at least one compound of the formula II,

II in which $R^{21}$ denotes an alkyl or alkenyl radical having up to 15 C atoms which is unsubstituted, or monosubstituted by CN or $CF_3$ or at least monosubstituted by halogen, where, in addition, one or more $CH_2$ groups in these radicals may be replaced by —O—, —S—,

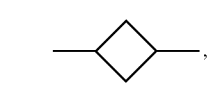

—C≡C—, —OC—O—, or —O—CO— in such a way that O atoms are not linked directly to one another, and $X^{21}$ denotes F, Cl, CN, a halogenated alkyl, or alkoxy radical having 1 to 6 C atoms or a halogenated alkenyl radical having 2 to 6 C atoms, and at least one compound of the formula III,

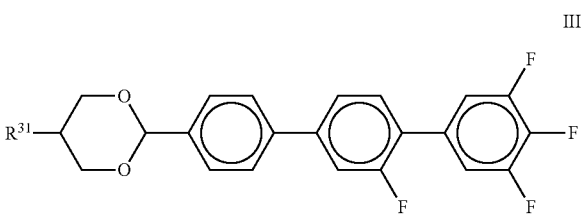

III in which $R^{31}$ denotes an alkyl or alkenyl radical having up to 15 C atoms which is unsubstituted, monosubstituted by CN or CF3 or at least monosubstituted by halogen, where, in addition, one or more CH2 groups in these radicals may be replaced by —O—, —S—, —C≡C—, —CH═CH—, —OC—O— or —O—CO— in such a way that O atoms are not linked directly to one another.

In a preferred embodiment, the compounds of the formula I are selected from the compounds of the formula Ia to Io,

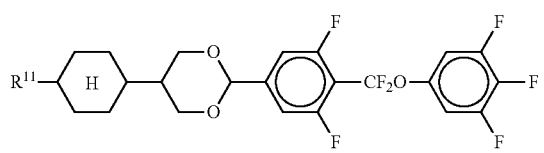

Ia

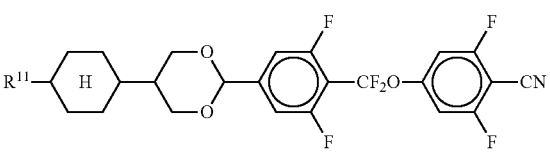

Ib

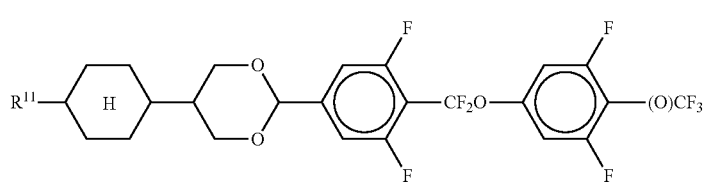

Ic

-continued
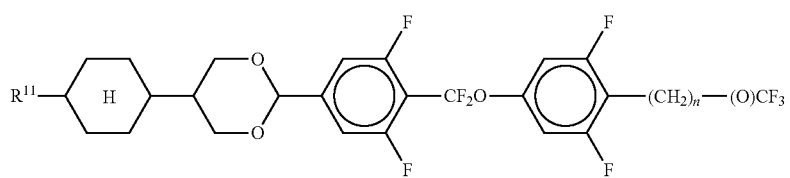
Id
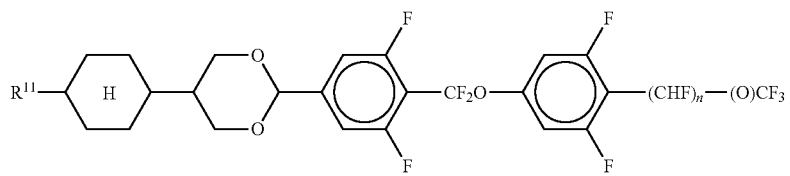
Ie
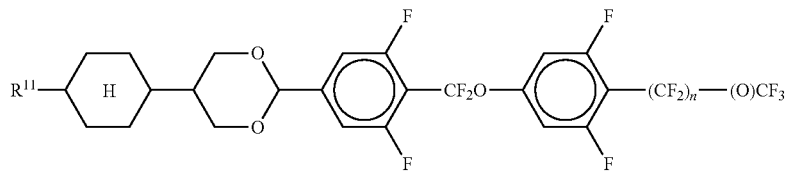
If
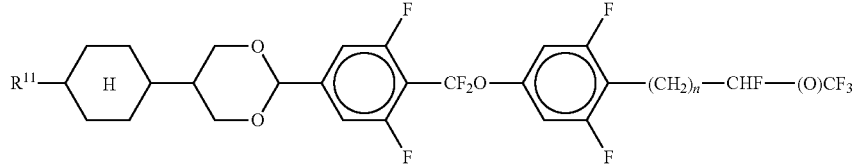
Ig
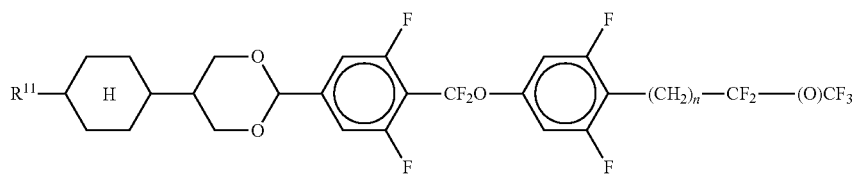
Ih
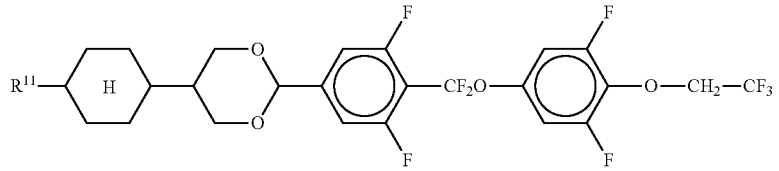
Ii
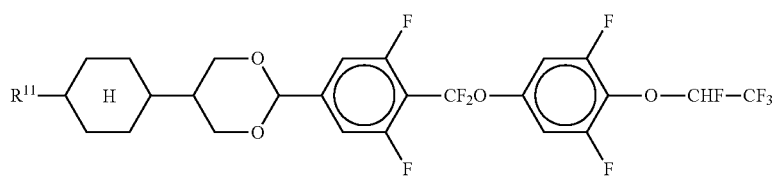
Ij
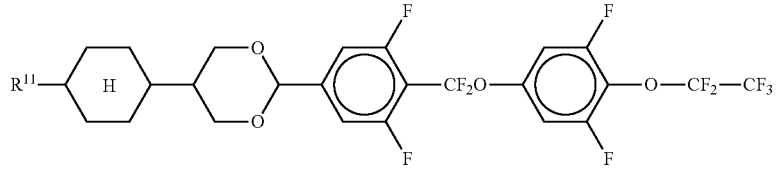
Im
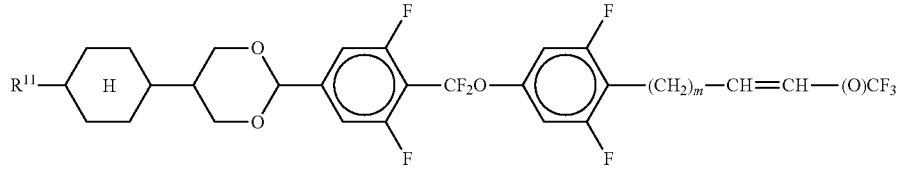
In -continued

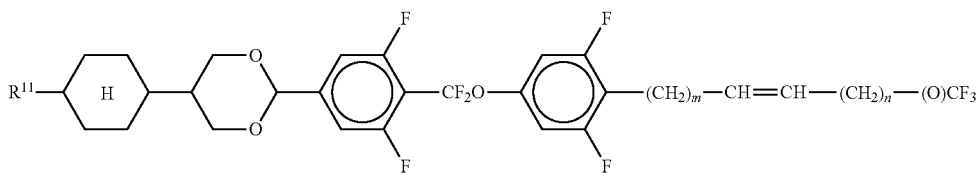
Io in which
R[11] has one of the meaning indicated under formula I,
n denotes 1 to 5, and
m denotes 0 to 5.

The compounds are particularly preferably selected from the compounds of the formulae Ia to Ic.

In a preferred embodiment, the compounds of the formula II are selected from the compounds of the formulae IIa to IIe,

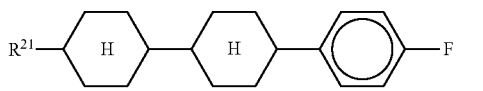
IIa

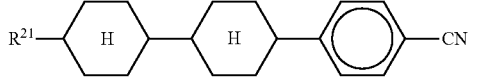
IIb

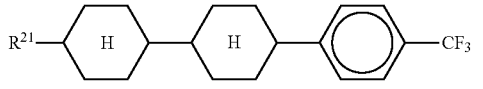
IIc

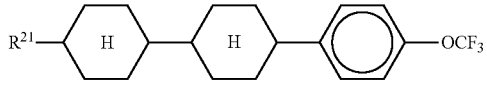
IId

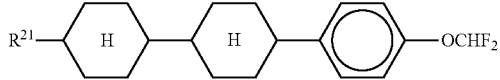
IIe in which R[21] has one of the meaning indicated under formula II.

The compounds of the formula II are especially preferably selected from the compounds of the formulae IIa, IIc and IId.

In a further embodiment, the medium according to the invention comprises at least one compound of the formula I*,

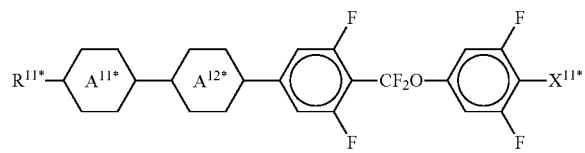
I* in which
R[11]* denotes an unsubstituted alkyl radical having 1 to 15 C atoms, where, in addition, one or more $CH_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, preferably a straight-chain alkyl radical having 2 to 7 C atoms, $A^{11*}$, $A^{12*}$ each, independently of one another, denote

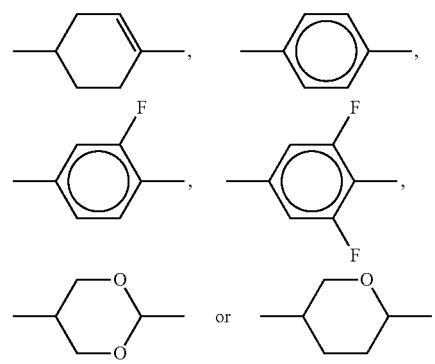

and $X^{11*}$ denotes F, Cl, CN or alkyl, alkenyl, alkenyloxy, alkylalkoxy or alkoxy having 1 to 3 C atoms, which is mono- or polysubstituted by F, preferably denotes F, Cl, CN, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, very particularly preferably F, CN, $CF_3$, $OCHF_2$ or $OCF_3$.

The compounds of the formula I* are particularly preferably selected from the sub-formulae I*a to I*d,

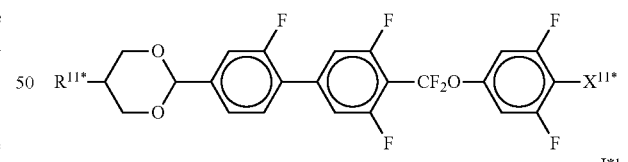
I*a

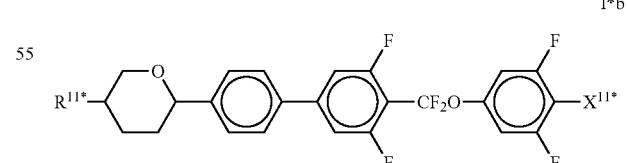
I*b

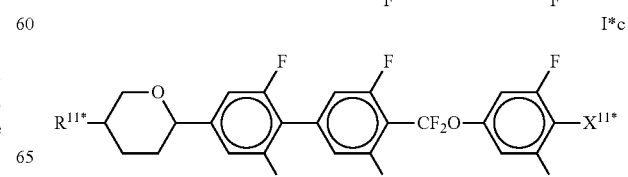
I*c

-continued

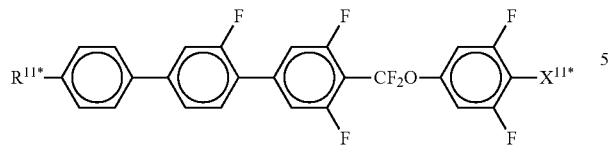
I*d in which R^{11*} and X^{11*} each have one of the meaning indicated under formula I*.

Especial preference is given here to the compounds of the sub-formulae I*a to I*d where $X^{11*}$ is equal to F, $CF_3$ or $OCF_3$.

In a further embodiment, the medium according to the invention comprises at least one compound of the formula IV,

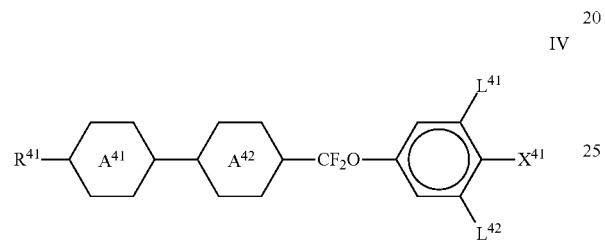
IV in which

R^{41} denotes an unsubstituted alkyl radical having 1 to 15 C atoms, where, in addition, one or more $CH_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, preferably a straight-chain alkyl radical having 2 to 7 C atoms, $A^{41}$, $A^{42}$ each, independently of one another, denote

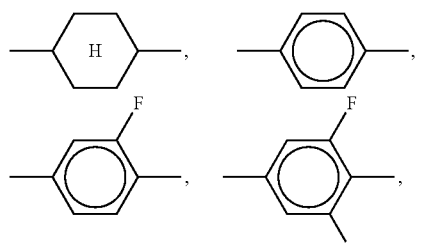

and $L^{41}$ and $L^{42}$ each, independently of one another, denote H or F, preferably both denote F, and $X^{41}$ denotes F, Cl, CN, or alkyl, alkenyl, alkenyloxy, alkylalkoxy or alkoxy having 1 to 3 C atoms, which is mono- or polysubstituted by F, preferably denotes F, $CF_3$ or $OCF_3$.

The compounds of the formula IV are particularly preferably selected from the sub-formulae IVa to IVj,

IVa
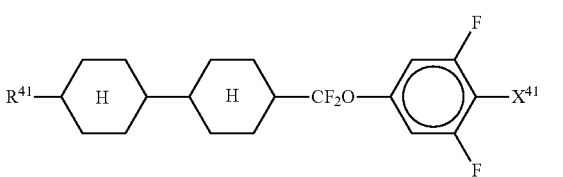
IVb
IVc
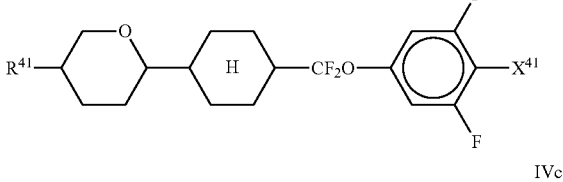
IVd
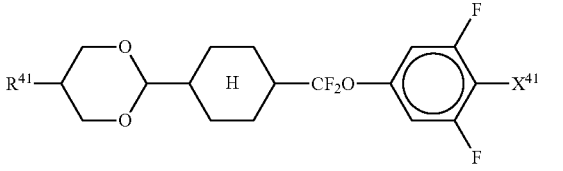
IVe
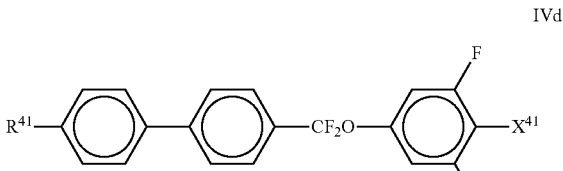
IVf
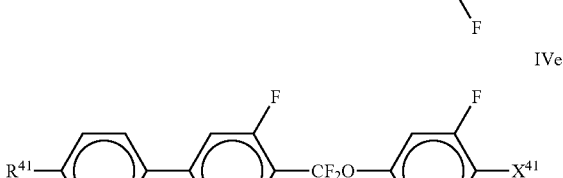
IVg
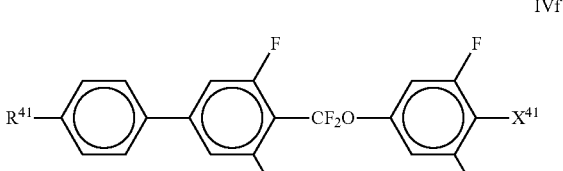
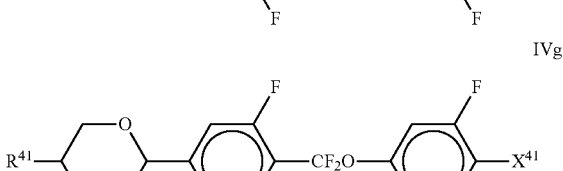
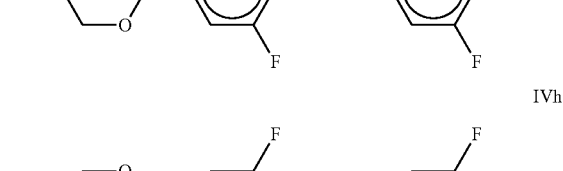
IVh
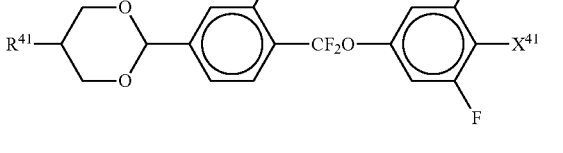

-continued

IVj

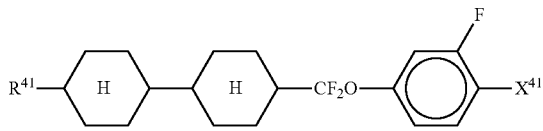

in which $R^{41}$ and $X^{41}$ each have one of the meaning indicated under formula IV.

Especial preference is given to the compounds of the sub-formulae IVa to IVj where $X^{41}$ is equal to F.

In a further preferred embodiment, the medium according to the invention comprises at least one compound of the formula V,

V

in which $R^{51}$ and $R^{52}$ each, independently of one another, denote an unsubstituted, alkyl or alkenyl radical having up to 15 C atoms, where, in addition, one or more $CH_2$ groups in these radicals may be replaced by —O—, —S—,

—C≡C—, —OC—O—, or —O—CO— in such a way that O atoms are not linked directly to one another.

The compounds of the formula V are particularly preferably selected from the compounds of the formulae Va and Vb, Va

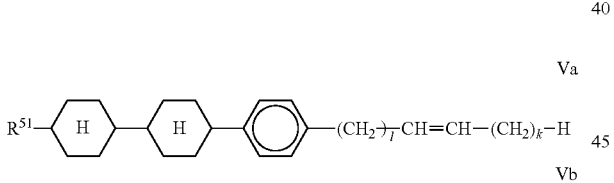

Vb in which $R^{51}$ and $R^{52}$ each, independently of one another, have one of the meanings indicated under formula V and k and l each, independently of one another, denote 0 to 5.

In a further, preferred embodiment, the medium according to the invention comprises at least one compound of the formula VI,

VI

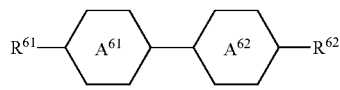

in which $R^{61}$ denotes an alkyl, or alkoxy radical having 1 to 10 C atoms or an alkenyl radical having 2 to 10 C atoms, $R^{62}$ has one of the meanings of $R^{61}$ or denotes $X^{61}$, $A^{61}$ and $A^{62}$ denote

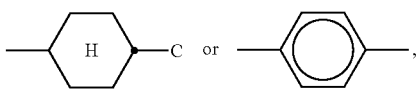

$X^{61}$ denotes F, Cl, CN, a halogenated alkyl, or alkoxy radical having 1 to 6 C atoms or a halogenated alkenyl radical having 2 to 6 C atoms, preferably F, Cl, CN, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, very particularly preferably F, CN, $OCHF_2$ or $OCF_3$, especially preferably F.

In a further preferred embodiment, the compounds of the formula VI are selected from the compounds of the formulae VIa to VIc, VIa

VIb

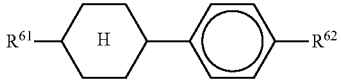

VIc

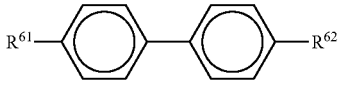

in which $R^{61}$ and $R^{62}$ each, independently of one another, have one of the meaning indicated under formula VI.

Especial preference is given here to compounds of the formula VIa where $R^{61}$ is equal to alkyl and $R^{62}$ is equal to alkenyl.

In a further preferred embodiment, the medium according to the invention comprises at least one compound of the formula VII,

VII

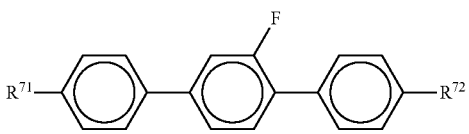

in which $R^{71}$ and $R^{72}$ each, independently of one another, denote an unsubstituted, alkyl or alkenyl radical having up to 15 C atoms, where, in addition, one or more $CH_2$ groups in these radicals may be replaced by —O—, —S—,

—C≡C—, —OC—O—, or —O—CO— in such a way that O atoms are not linked directly to one another.

In a further embodiment, the medium according to the invention comprises at least one of the compounds of the formula VIII,

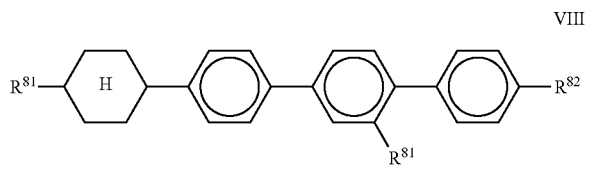

in which
R$^{81}$ and R$^{82}$ each, independently of one another, denote an unsubstituted, alkyl or alkenyl radical having up to 15 C atoms, where, in addition, one or more CH$_2$ groups in these radicals may be replaced by —O—, —S—,

—C≡C—, —OC—O—, or —O—CO— in such a way that O atoms are not linked directly to one another,
L$^{81}$ denotes H or F.

Particularly preferred compounds of the formula VIII are the compounds of the following sub-formulae VIII-1 and VIII-2,

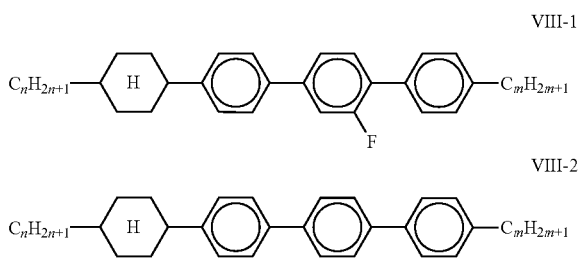

in which n and m, independently of one another, denotes 1 to 7.

If R$^{11-82}$ in the above formulae denotes an alkyl radical and/or an alkoxy radical, this may be straight-chain or branched. It is preferably straight-chain, has 1, 2, 3, 4, 5, 6 or 7 C atoms and accordingly preferably denotes methyl, ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradedoxy.

If R$^{11-82}$ denotes an alkenyl radical, the expression "alkenyl" encompasses straight-chain and branched alkenyl groups having 2-7 carbon atoms, in particular the straight-chain groups. Preferred alkenyl groups are C$_2$-C$_7$-1E-alkenyl, C$_4$-C$_7$-3E-alkenyl, C$_5$-C$_7$-4-alkenyl, C$_6$-C$_7$-5-alkenyl and C$_7$-6-alkenyl, in particular C$_2$-C$_7$-1E-alkenyl, C$_4$-C$_7$-3E-alkenyl and C$_5$-C$_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

If R$^{11-82}$ denotes an alkyl or alkenyl radical which is at least monosubstituted by halogen, this radical is preferably straight-chain and halogen is preferably F or Cl. In the case of polysubstitution, halogen is preferably F. The resultant radicals also include perfluorinated radicals. In the case of monosubstitution, the fluorine or chlorine substituent can be in any desired position, but is preferably in the ω-position.

In the pure state, the compounds of the formula I to VIII are colourless and form liquid-crystalline mesophases in a temperature range which is favourably located for electrooptical use. They are stable chemically, thermally and to light.

The individual compounds of the above-mentioned formulae and their sub-formulae which can be used in the media according to the invention are either known, or they are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail.

The optimum mixing ratio of the compounds of the above-mentioned formulae depends substantially on the desired properties, on the choice of the components of the above-mentioned formulae and on the choice of other components optionally present.

Suitable mixing ratios within the range indicated above can easily be determined from case to case.

The total amount of compounds of the above-mentioned formulae in the mixtures according to the invention is not crucial. The mixtures may therefore comprise one or more further components in order to optimise various properties. However, the observed effect on the desired improvement of the properties of the mixture is generally greater, the higher the total concentration of compounds of the above-mentioned formulae.

Further preferred embodiments are indicated below:

The medium comprises one or more compounds of the formula I with a proportion of compounds of the formula I, preferably of the formula Ib, in the mixture as a whole between 1-40% by weight, preferably 2-35% by weight, particularly preferably 3-30% by weight, and at least one compound of the formula II, preferably of the formula IId, with a proportion of in the mixture as a whole between 1-80% by weight, preferably 2-70% by weight, particularly preferably 3-60% by weight, and at least one compound of the formula III with a proportion in the mixture as a whole between 1-40% by weight, preferably 2-30% by weight, particularly preferably 3-20% by weight, and the above-mentioned mixture concept preferably comprises optionally one, two, three or more compounds of the formula I*, preferably selected from the compounds of the formulae I*a, I*b and I*d, where the proportion in the mixture as a whole is up to 75% by weight, preferably up to 70% by weight, particularly preferably up to 60% by weight, and/or optionally one, two, three or more compounds of the formula IV, preferably selected from the compounds of the formula IV, particularly preferably in which X$^{41}$ denotes fluorine, where the proportion of compounds of the formulae IV in the mixture as a whole is up to 50% by weight, preferably up to 40% by weight, and/or optionally one, two, three or more compounds of the formula V, where the proportion of compounds of the formulae V in the mixture as a whole is up to 40% by weight, preferably up to 35% by weight, particularly preferably up to 30% by weight, and/or optionally one, two, three or more compounds of the formula VI, with a proportion of compounds of the formulae VI in the mixture as a whole up to 80% by weight, up to 75% by weight, particularly preferably up to 70% by weight, and/or optionally one, two, three or more compounds of the formula VII with a proportion of compounds of the formulae VII in the mixture as a whole up to 50% by weight, preferably up to 40% by weight, particularly preferably up to 30% by weight, and/or optionally one, two, three or more compounds of the formula VIII with a proportion of compounds of the formulae VIII in the mixture as a whole up to 40% by weight, preferably up to 30% by weight, particularly preferably up to 20% by weight.

In a further preferred embodiment, the medium, besides at least one compounds of the formula I, at least one compound of the formula II and at least one compound of the formula III, furthermore comprises at least one, preferably two compounds of the formula VIa.

In a further preferred embodiment, the medium, besides at least one compounds of the formula I, at least one compound of the formula II and at least one compound of the formula III, furthermore comprises at least one, preferably two compounds of the formula I* and at least one, preferably two compounds of the formula VIa.

It has been found that even a relatively low proportion of compounds of the formulae I and III in a mixture with conventional liquid-crystal materials results in a significant increase in the elastic constants, where at the same time low values for the rotational viscosity with a view to achieving fast response times, and relatively high values for dielectric anisotropy are observed. At the same time, the mixtures exhibit very good low-temperature stability.

The invention also relates to electro-optical displays, such as, for example, STN or MLC displays, having two plane-parallel outer plates, which, with a frame, form a cell, integrated non-linear elements for switching individual pixels on the outer plates, and a nematic liquid-crystal mixture having positive dielectric anisotropy and high specific resistance which is located in the cell), which comprise media of this type and to the use of these media for electro-optical purposes.

The liquid-crystal mixtures according to the invention facilitate an important broadening of the available parameter latitude. The achievable combinations of high elastic constants, low rotational viscosity and relatively high dielectric anisotropy far exceed previous materials from the prior art.

The mixtures according to the invention are particularly suitable for mobile applications and low-$\Delta n$ TFT applications, such as, for example, mobile telephones and PDAs.

The liquid-crystal mixtures according to the invention simultaneously enable dielectric anisotropy values $\geq+3$, preferably $\geq+7$, particularly preferably $\geq+10$, and a high value for the specific resistance to be achieved while retaining the nematic phase down to $-20°$ C. and preferably down to $-30°$ C., particularly preferably down to $-40°$ C., and the clearing point $80°$ C., preferably $\geq90°$ C., particularly preferably $\geq100°$ C., enabling excellent MLC displays to be achieved. In particular, the mixtures are characterised by low operating voltages.

The threshold voltage of the liquid-crystal mixtures according to the invention is preferably $\leq2.0$ V, particularly preferably $\leq1.5$ V.

The birefringence $\Delta n$ of the liquid-crystal mixtures according to the invention is preferably $\leq0.14$, particularly preferably $\leq0.13$, especially preferably $\leq0.12$.

The rotational viscosity $\gamma_1$ of the liquid-crystal mixtures according to the invention at $20°$ C. is preferably $\leq180$ mPa·s, preferably $\leq150$ mPa·s, particularly preferably $\leq125$ mPa·s.

The nematic phase range of the liquid-crystal mixtures according to the invention preferably has a width of at least $90°$, in particular at least $100°$. This range preferably extends at least from $-40°$ to $+110°$ C.

In view of the advantageous, high elastic constants of the medium according to the invention, the corresponding characteristic number is determined by the values of $K_{ave}$.

$K_{ave}$ is calculated by $$K_{ave}=(K_{11}+K_{22}+K_{33})/3$$

where $K_{22}$ can be approximated by $$K_{22} \approx K_{11}/2.$$

The values of $K_{ave}$ of the liquid-crystal mixtures according to the invention are preferably $\geq10$ pN, particularly preferably $\geq12$ pN, in particular $\geq13$ pN.

It goes without saying that a suitable choice of the components of the mixtures according to the invention also enables higher clearing points (for example above $100°$ C.) to be achieved at higher threshold voltages or lower clearing points to be achieved at lower threshold voltages while retaining the other advantageous properties. Likewise, mixtures having greater and thus low thresholds can be obtained at correspondingly less-increased viscosities. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German Patent 30 22 818) with the same threshold voltage as in an analogous display at the second minimum, a lower dielectric anisotropy is adequate here. This enables significantly higher specific resistances to be achieved using the mixtures according to the invention at the first minimum than in the case of mixtures comprising cyano compounds. The person skilled in the art will be able to set the birefringence necessary for a pre-specified layer thickness of the MLC display using simple routine methods through a suitable choice of the individual components and their proportions by weight.

Also in accordance with the invention is an electro-optical display having a re-alignment layer for re-alignment of the liquid crystals whose field has a component, crucial for the re-alignment, parallel to the liquid-crystal layer, which contains, as dielectric, a liquid-crystalline medium according to the invention.

The construction of the MLC display according to the invention from polarisers, electrode base plates and electrodes having surface treatment corresponds to the conventional design for displays of this type. The term conventional design is broadly drawn here and also encompasses all derivatives and modifications of the MLC display, in particular also matrix display elements based on poly-Si TFT or MIM.

However, an essential difference of the displays according to the invention from those conventional to date based on the twisted nematic cell consists in the choice of the liquid-crystal parameters of the liquid-crystal layer.

The liquid-crystal mixtures which can be used in accordance with the invention are prepared in a manner conventional per se, for example by mixing in each case one or more compounds of the formula I to III with one or more compounds of the formulae IV to VIII or with further liquid-crystalline compounds and/or additives. In general, the desired amount of the components used in smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

In the present application and in the following examples, the structures of the liquid-crystal compounds are indicated by means of acronyms, where the transformation into chemical formulae takes place in accordance with Table A. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the basic structure is indicated. In individual cases, the acronym for the basic structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Additional and preferred mixture components can be found in Tables A and B.

TABLE A

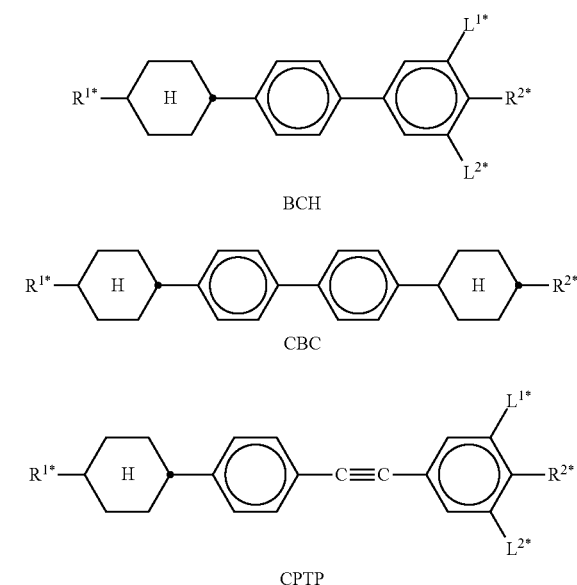

BCH

CBC

CPTP

TABLE A-continued

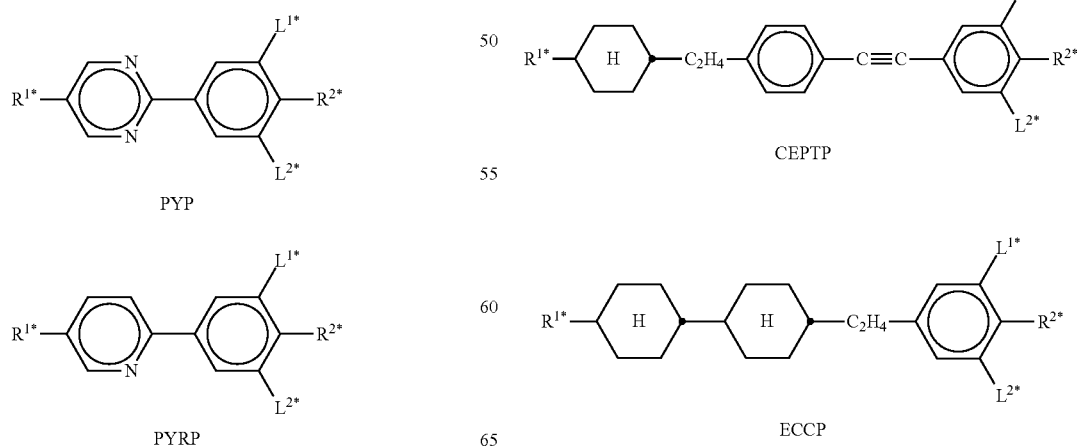

CEPTP

ECCP

PYP

PYRP

TABLE A-continued
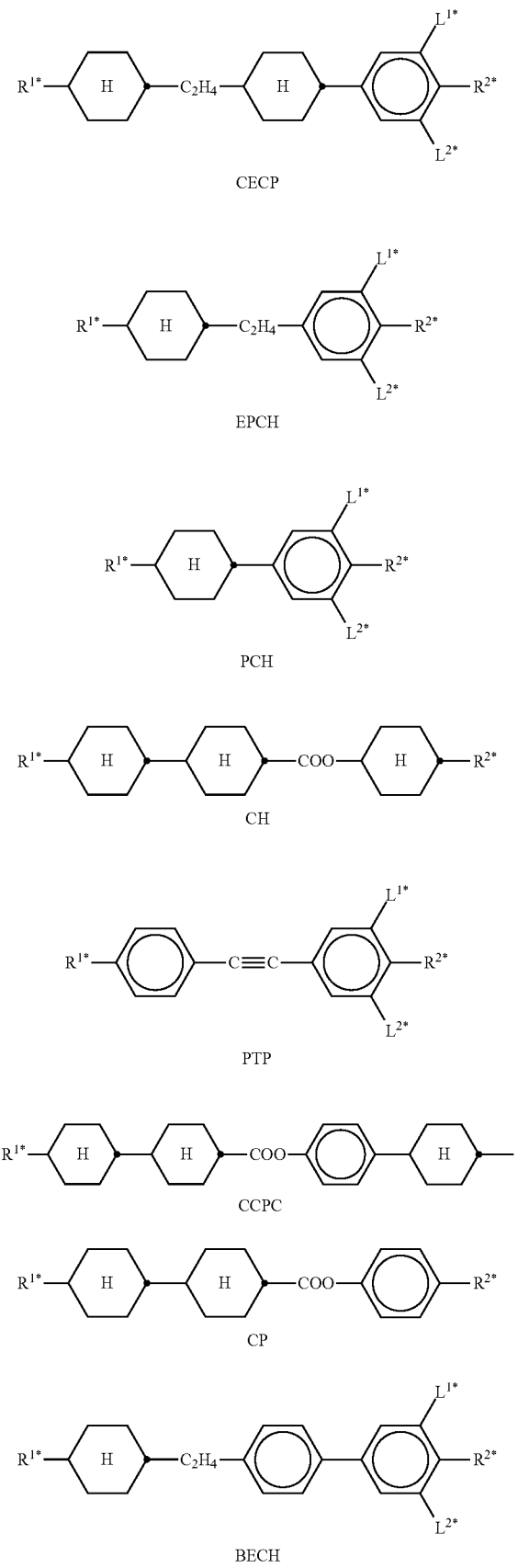
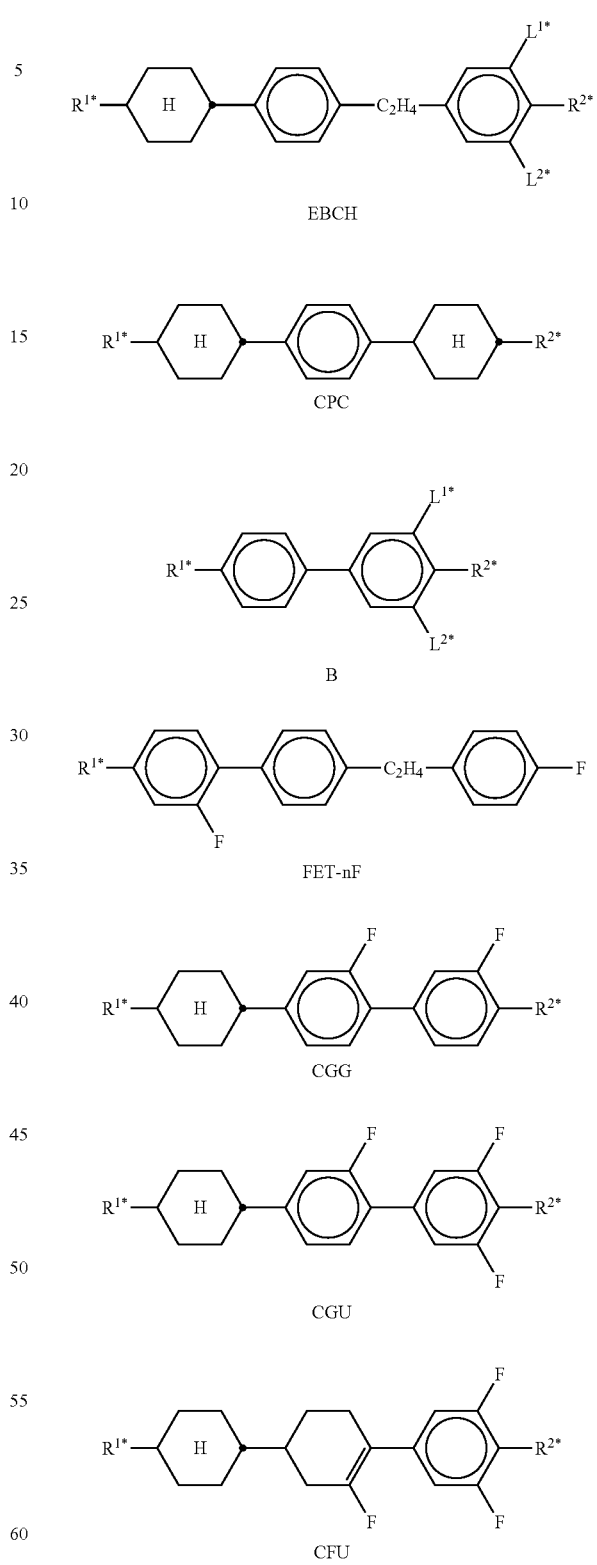
Particular preference is given to liquid-crystalline mixtures which, besides the compounds of the formulae I to III, comprise at least one, two, three, four or more compounds from Table B.

TABLE B
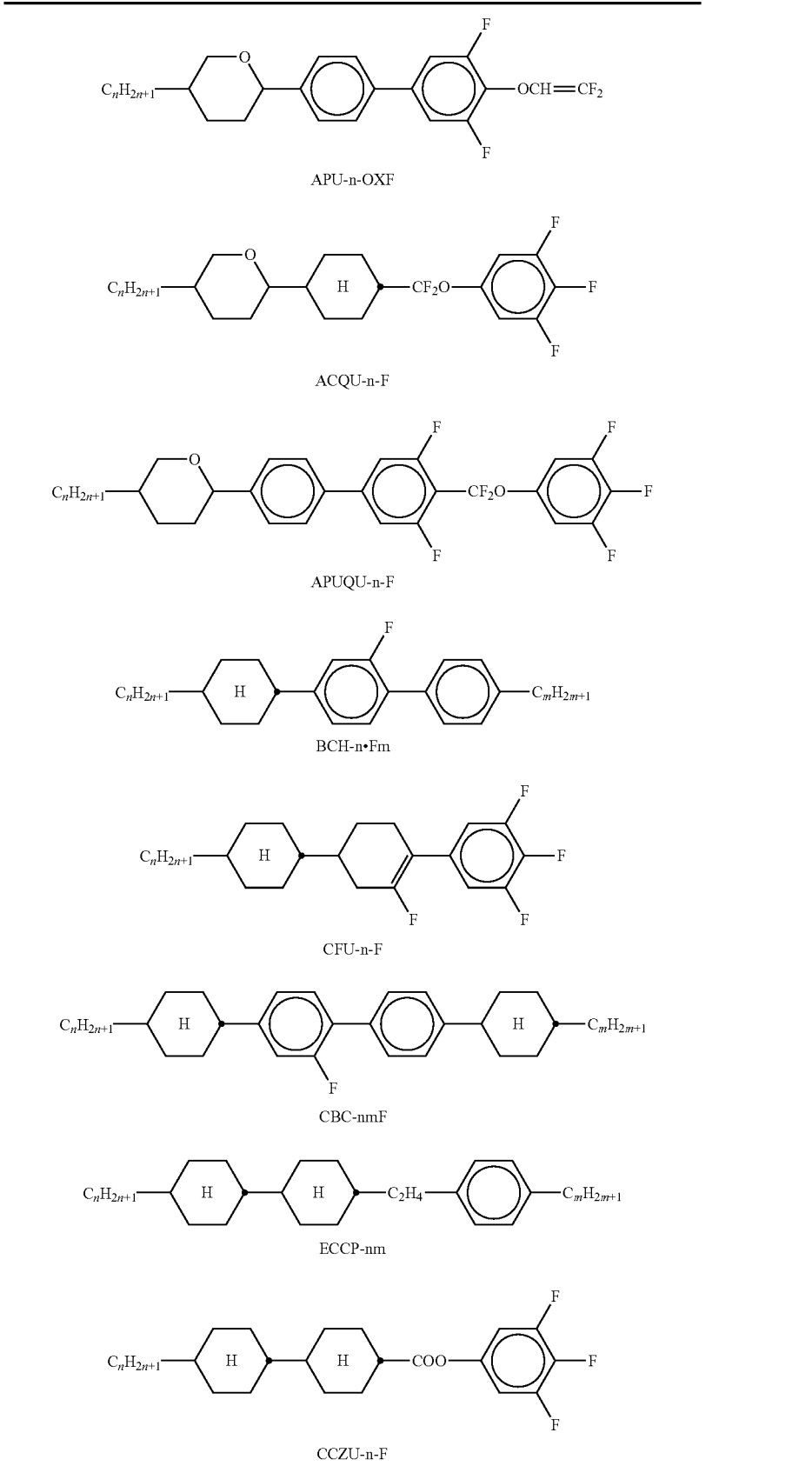

TABLE B-continued
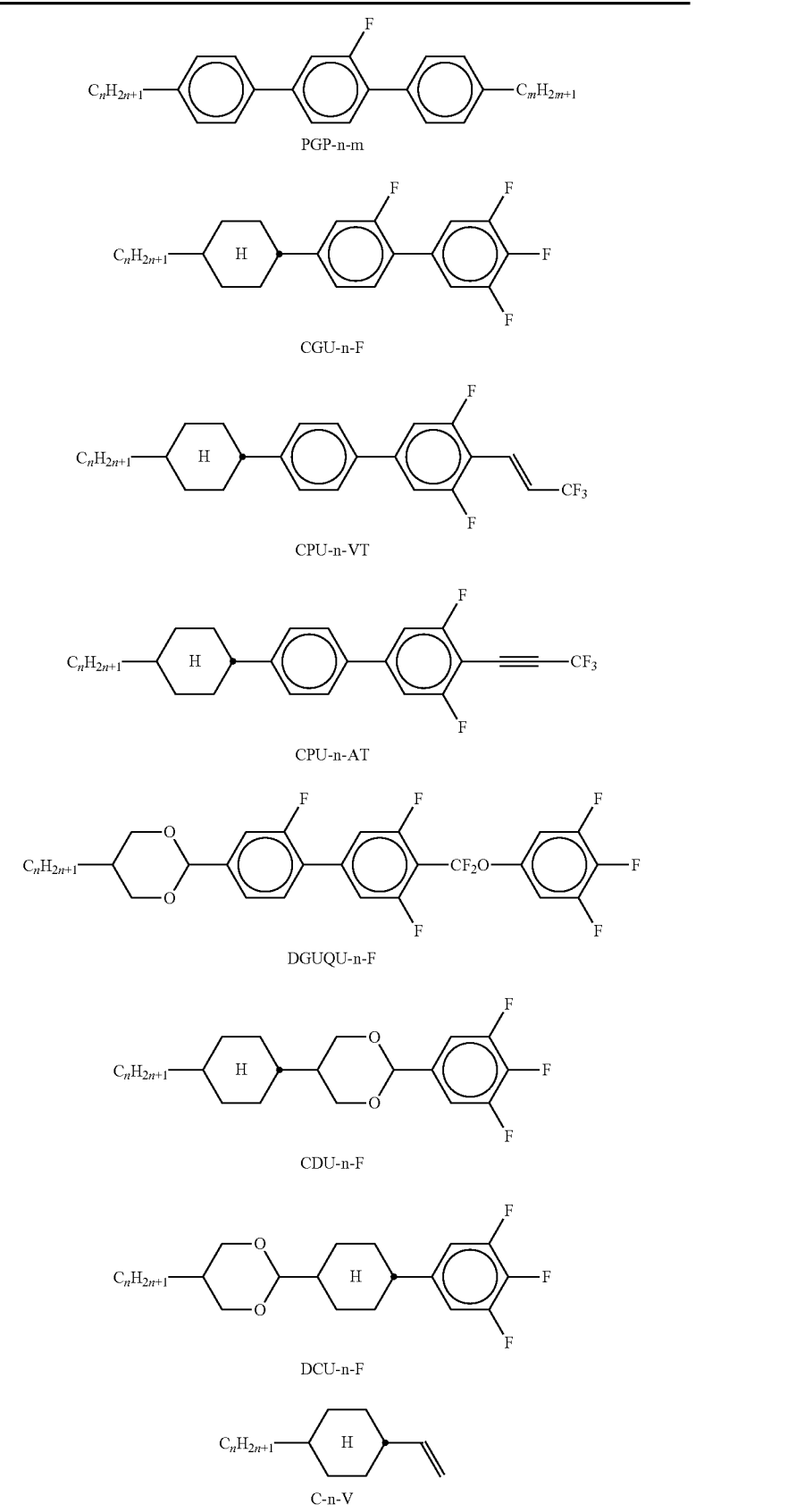

TABLE B-continued
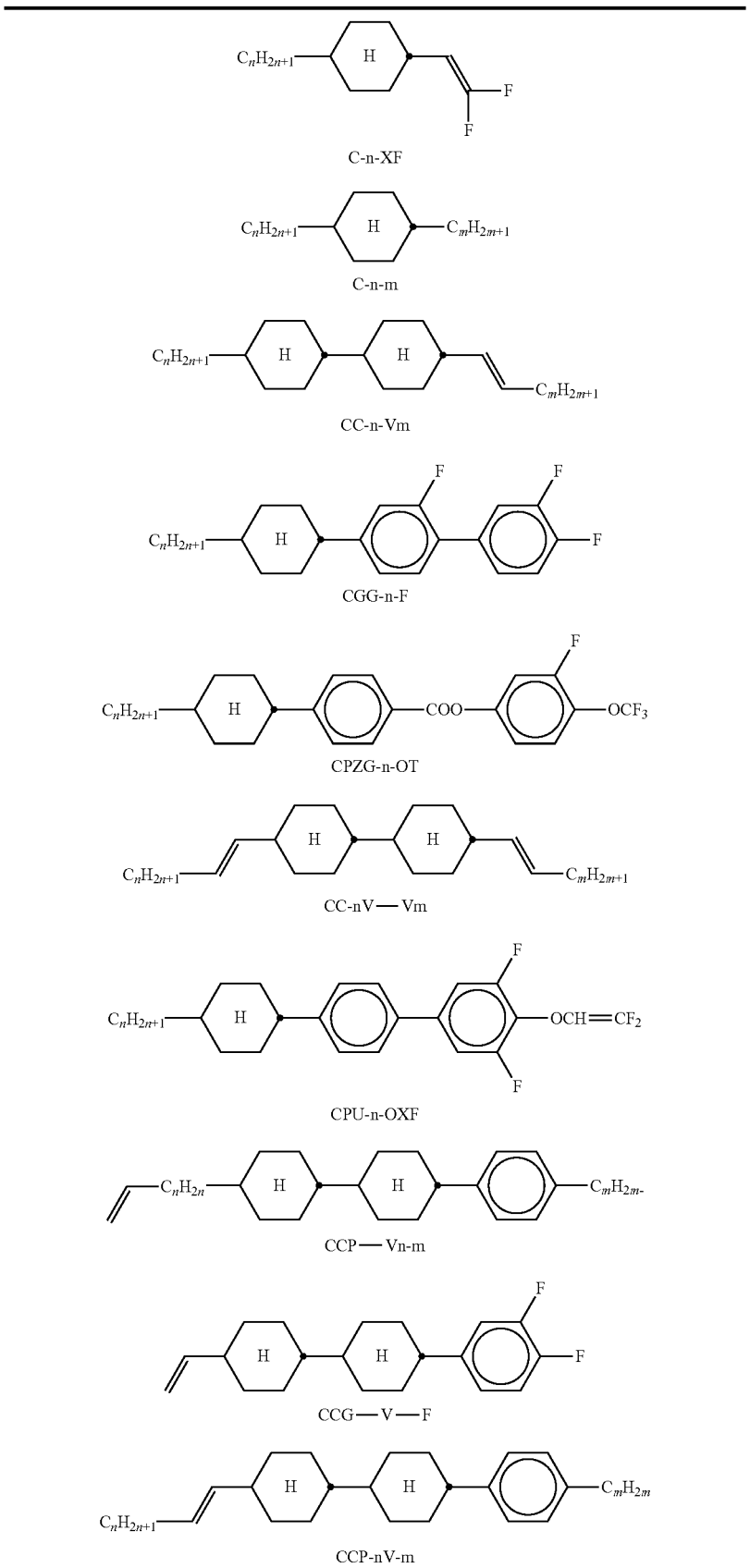

TABLE B-continued
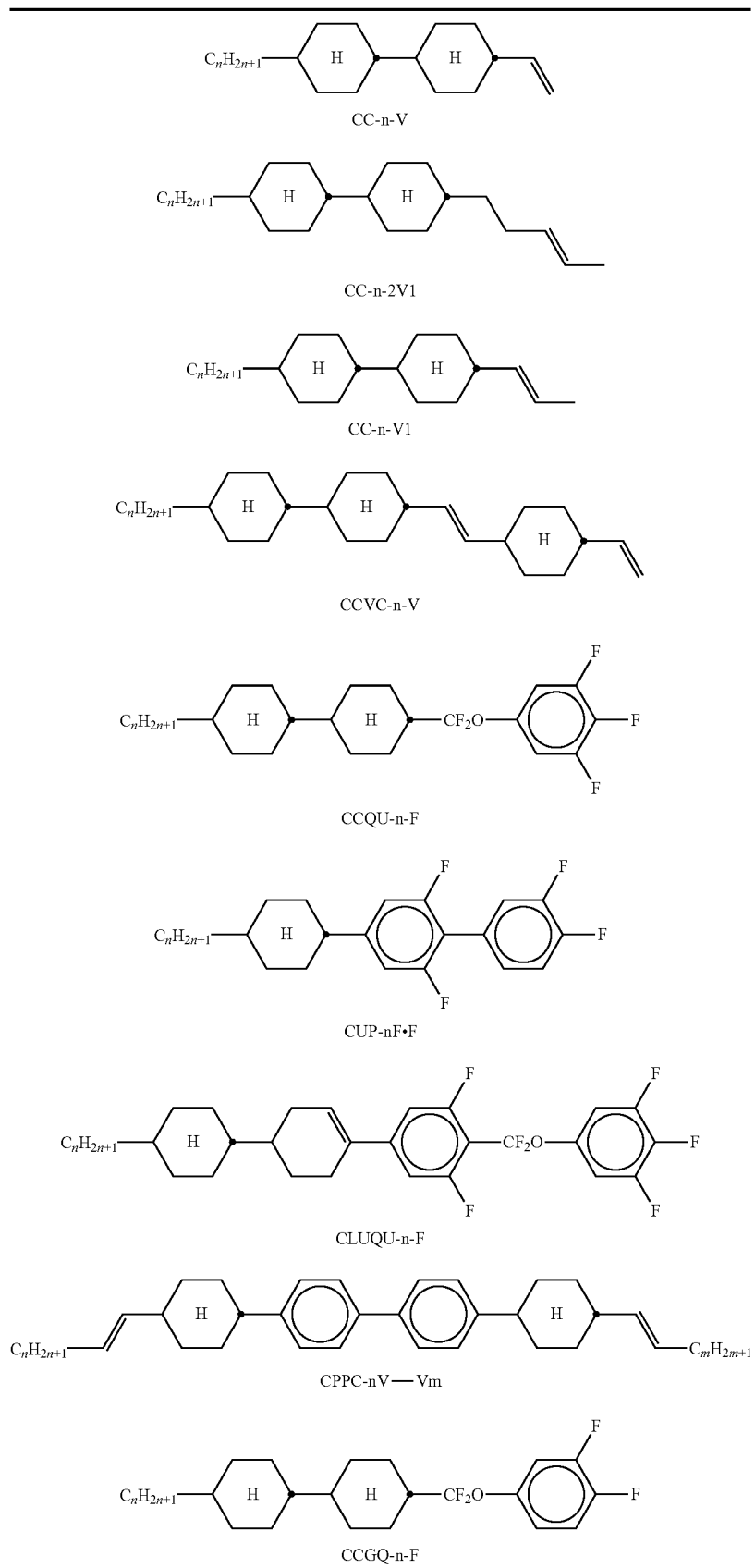

TABLE B-continued
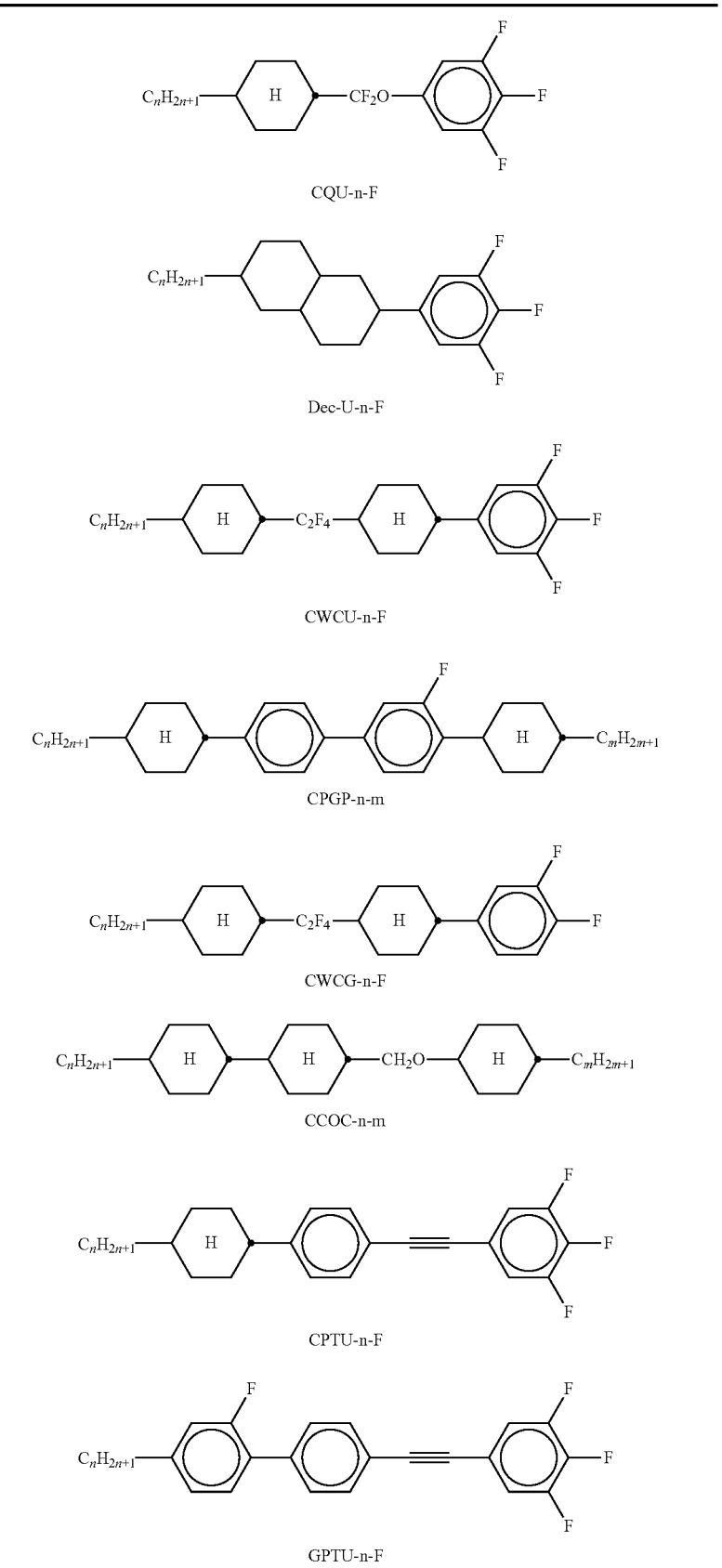

TABLE B-continued
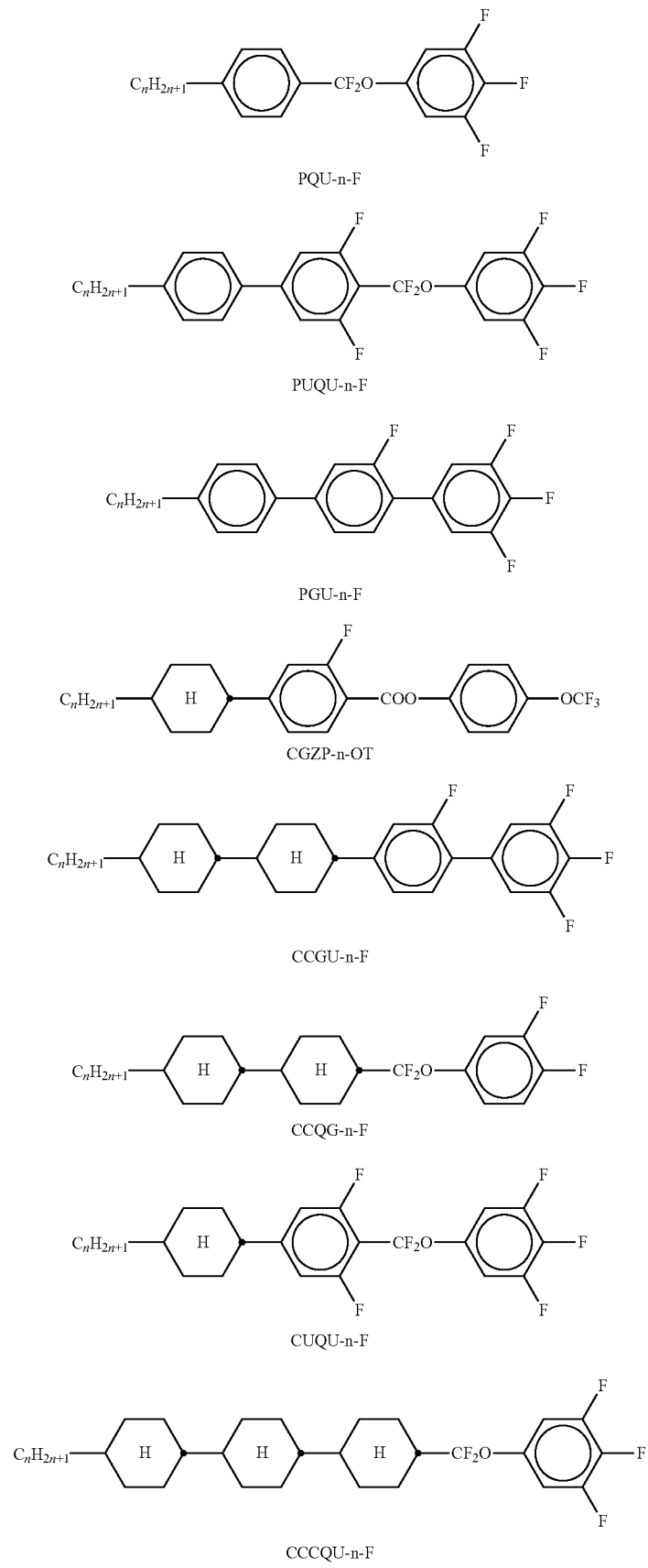

TABLE B-continued
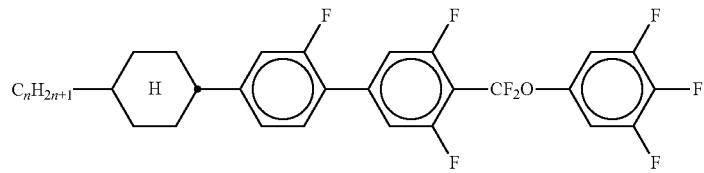
CGUQU-n-F
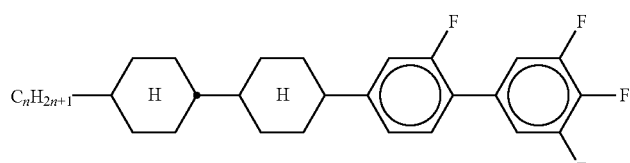
CCGU-n-F
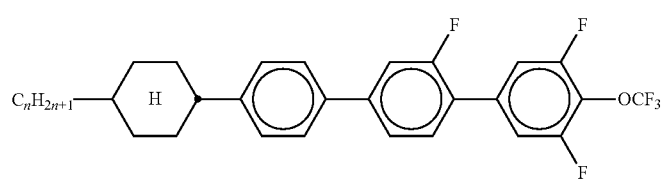
CPGU-n-OT
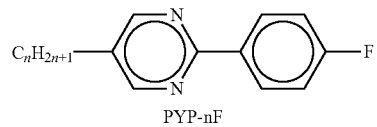
PYP-nF
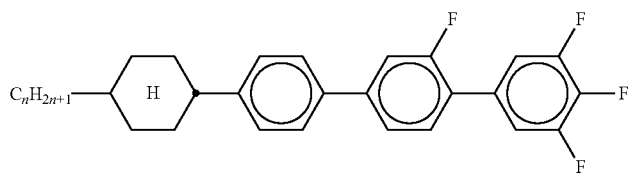
CPGU-n-F
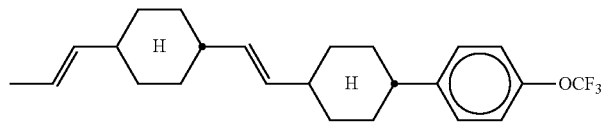
CVCP—1V—OT
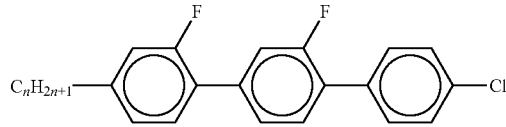
GGP-n-Cl
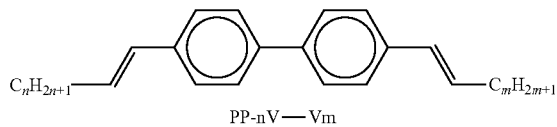
PP-nV—Vm
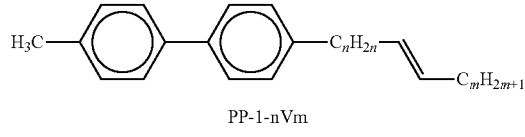
PP-1-nVm TABLE B-continued
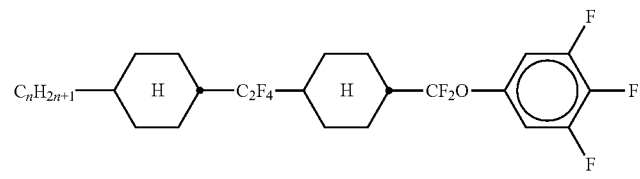
CWCQU-n-F
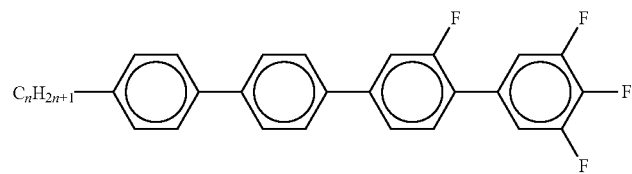
PPGU-n-F
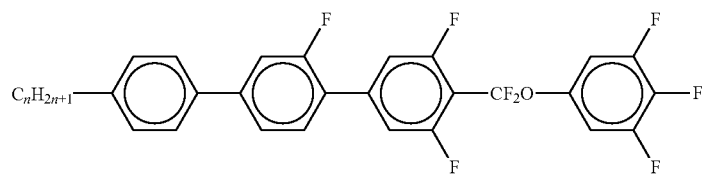
PGUQU-n-F
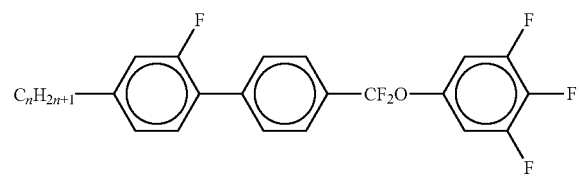
GPQU-n-F
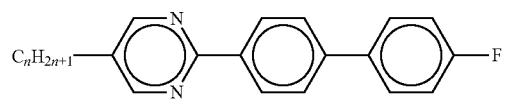
MPP-n-F
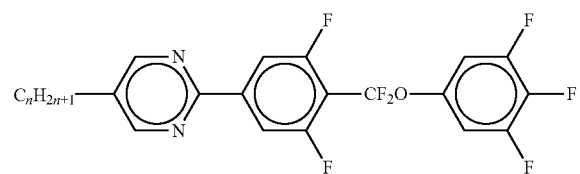
MUQU-n-F
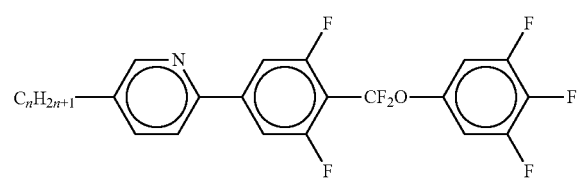
NUQU-n-F
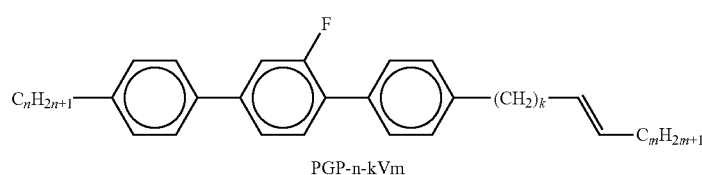
PGP-n-kVm TABLE B-continued

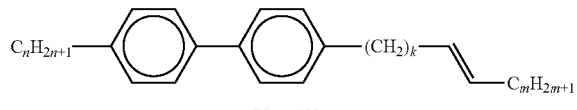
PP-n-kVm

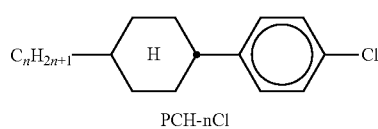
PCH-nCl

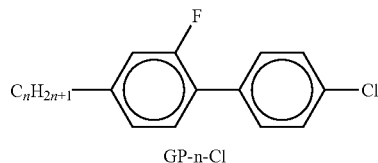
GP-n-Cl

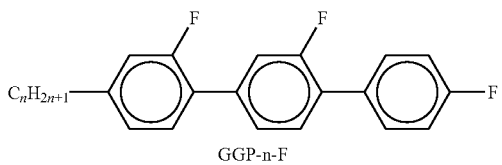
GGP-n-F

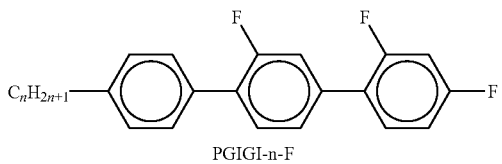
PGIGI-n-F

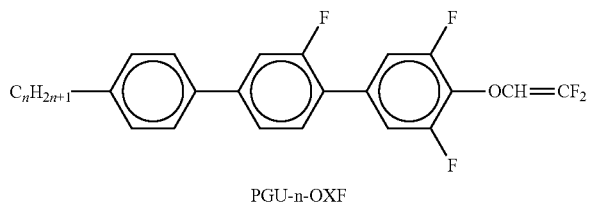
PGU-n-OXF (n = 1-15; $(O)C_nH_{2n+1}$ denotes $C_nH_{2n+1}$ or $OC_nH_{2n+1}$)

The dielectrics may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes, chiral dopants and polymerisable dopants may be added. Suitable stabilisers and dopants are shown below in Tables C, D and E.

TABLE C

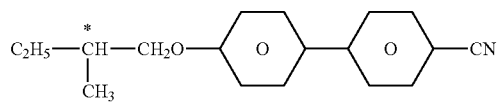
C 15

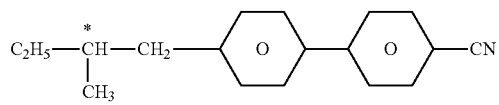
CB 15

TABLE C-continued
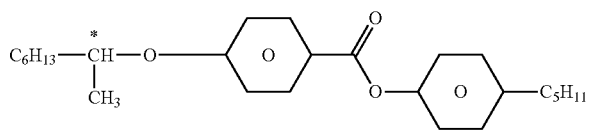
CM 21
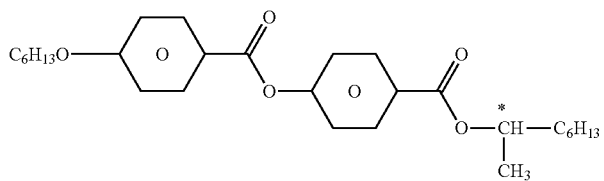
R/S-811
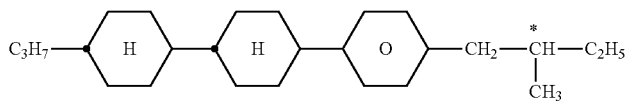
CM 44
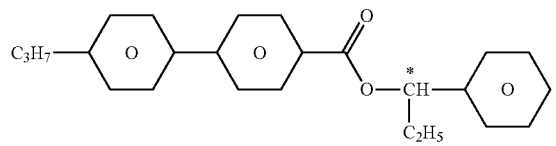
CM 45
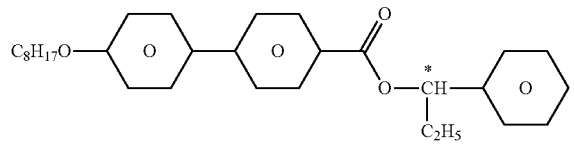
CM 47
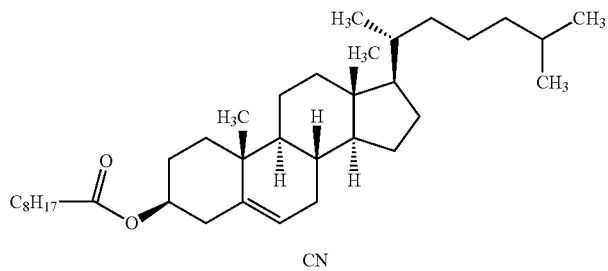
CN
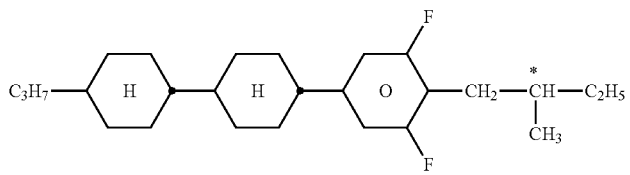
R/S-2011

TABLE C-continued
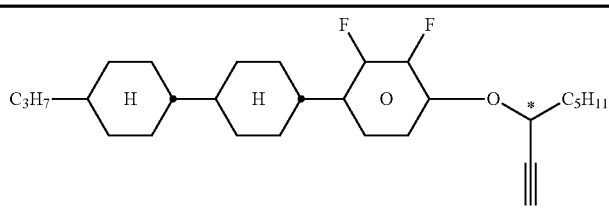
R/S-3011
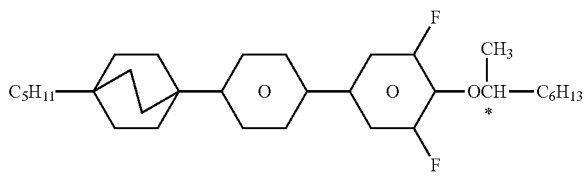
R/S-4011
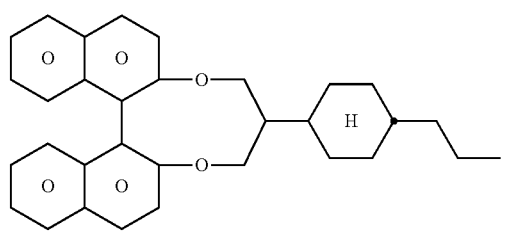
R/S-5011
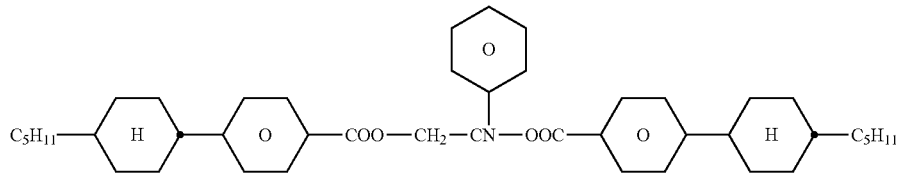
R/S-1011
Table C, D and E show possible dopants which are generally added to the mixtures according to the invention. The mixtures preferably comprise 0-10% by weight, in particular 0.01-5% by weight and particularly preferably 0.01-3% by weight of dopants from Table C.
TABLE D
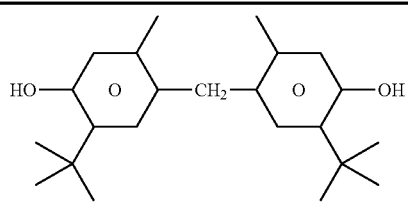
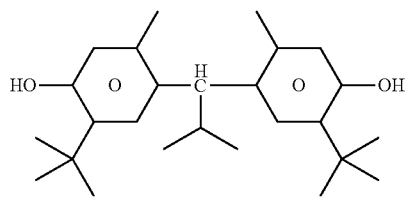

TABLE D-continued
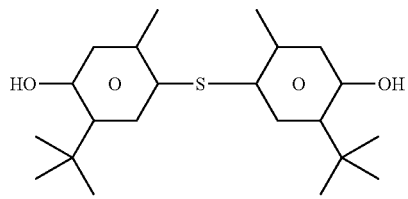
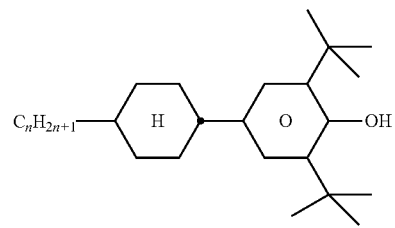
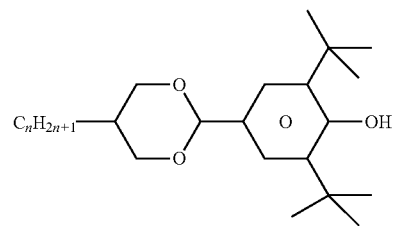
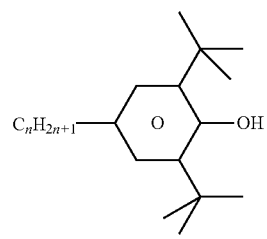
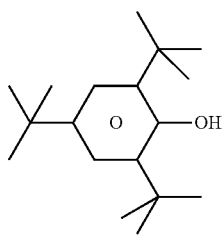
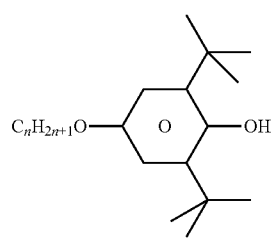

TABLE D-continued
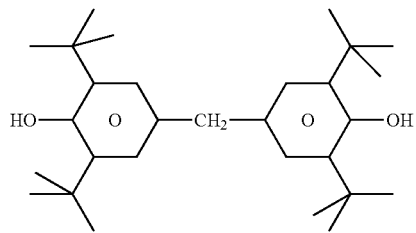
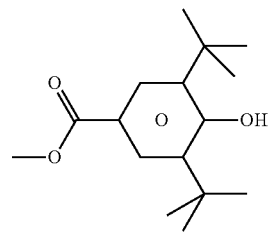
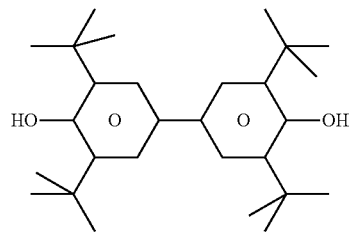
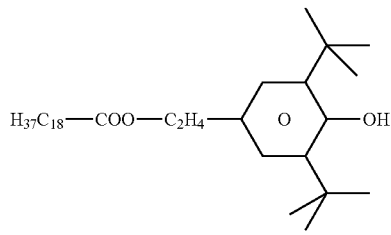
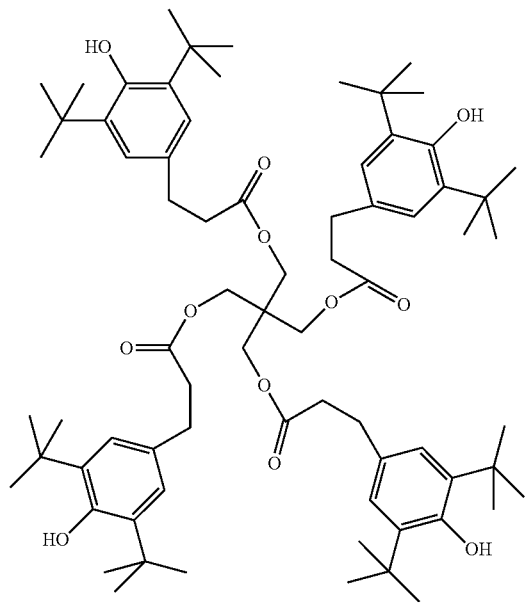 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
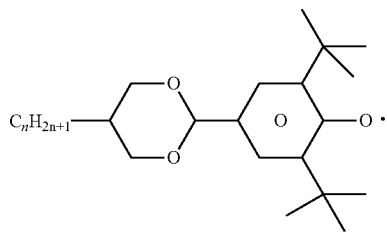
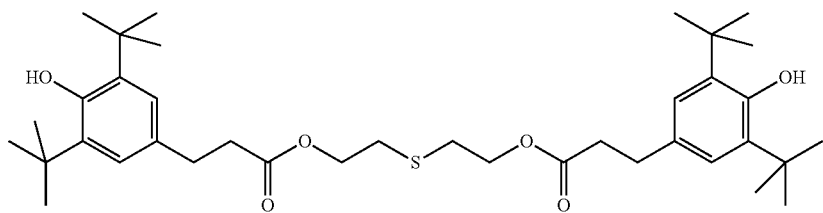 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
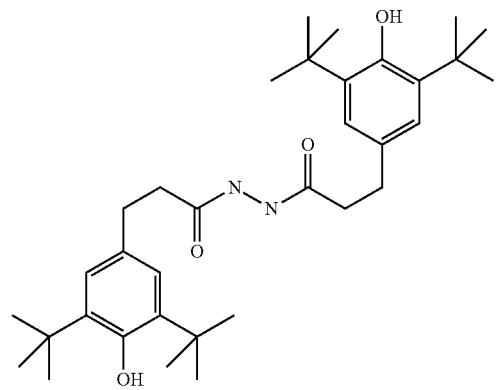 [SMILES: CC(C)(C)c1cc(CCC(=O)NNC(=O)CCc2cc(C(C)(C)C)c(O)c(C(C)(C)C)c2)cc(C(C)(C)C)c1O]
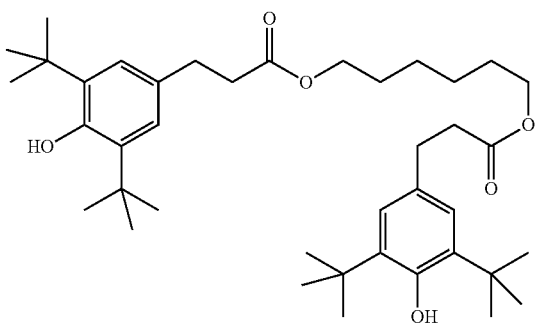 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
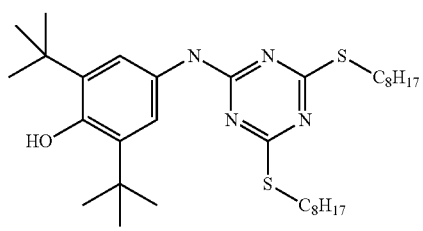

TABLE D-continued
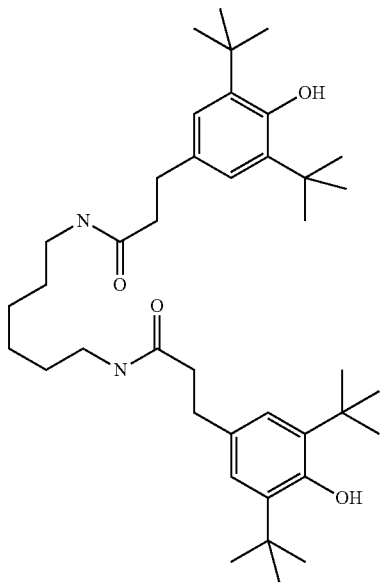 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
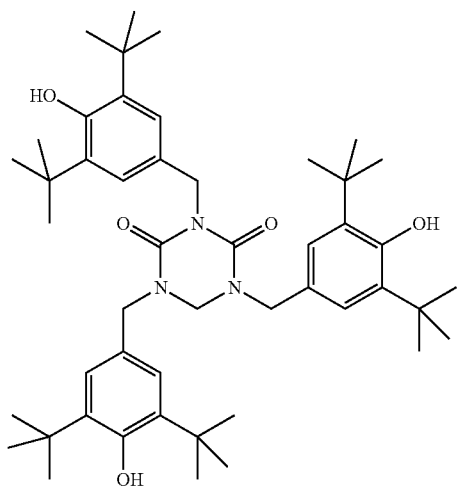 [SMILES: CC(C)(C)c1cc(CN2CN(Cc3cc(C(C)(C)C)c(O)c(C(C)(C)C)c3)C(=O)N(Cc3cc(C(C)(C)C)c(O)c(C(C)(C)C)c3)C2=O)cc(C(C)(C)C)c1O]
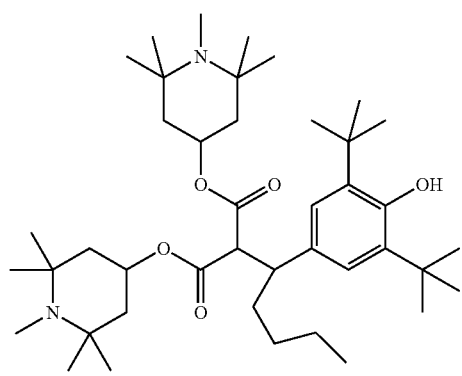 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
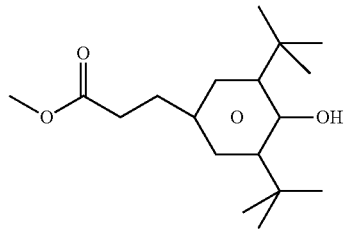
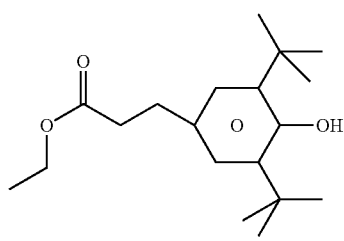
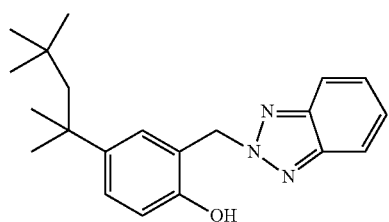 [SMILES: CC(C)(C)CC(C)(C)c1ccc(O)c(Cn2nc3ccccc3n2)c1]
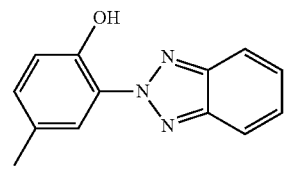 [SMILES: Cc1ccc(O)c(-n2nc3ccccc3n2)c1]
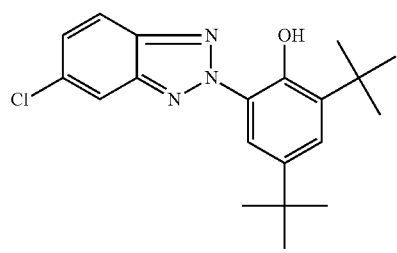 [SMILES: CC(C)(C)c1cc(-n2nc3ccc(Cl)cc3n2)c(O)c(C(C)(C)C)c1]
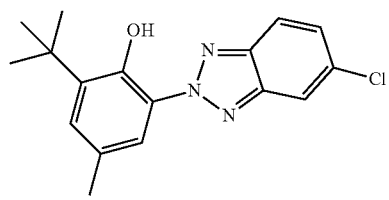 [SMILES: Cc1cc(-n2nc3ccc(Cl)cc3n2)c(O)c(C(C)(C)C)c1]

TABLE D-continued
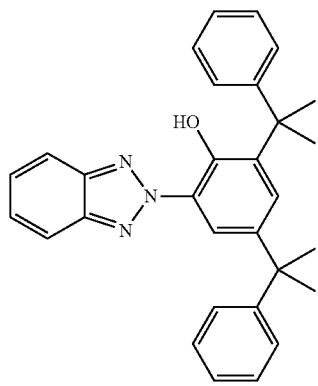 [SMILES: CC(C)(c1ccccc1)c1cc(-n2nc3ccccc3n2)c(O)c(C(C)(C)c2ccccc2)c1]
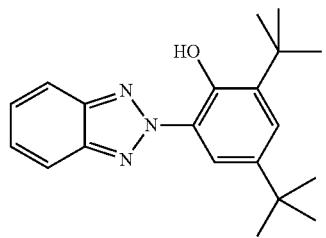 [SMILES: CC(C)(C)c1cc(-n2nc3ccccc3n2)c(O)c(C(C)(C)C)c1]
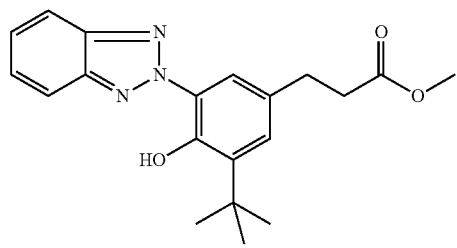 [SMILES: COC(=O)CCc1cc(-n2nc3ccccc3n2)c(O)c(C(C)(C)C)c1]
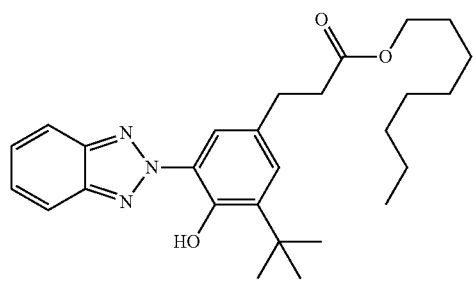 [SMILES: CCCCCCCCOC(=O)CCc1cc(-n2nc3ccccc3n2)c(O)c(C(C)(C)C)c1]

TABLE D-continued
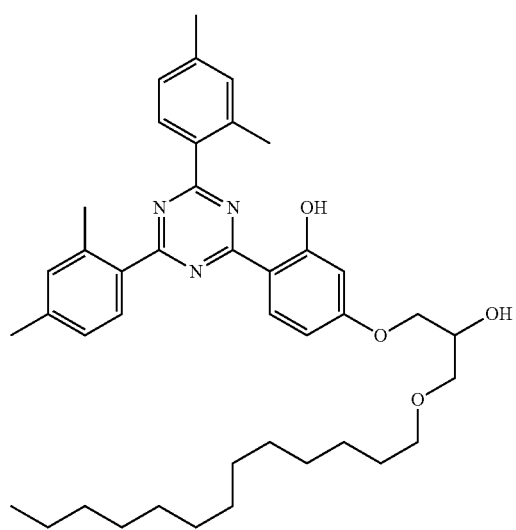 [SMILES: CCCCCCCCCCCCCOCC(O)COc1ccc(-c2nc(-c3ccc(C)cc3C)nc(-c3ccc(C)cc3C)n2)c(O)c1]
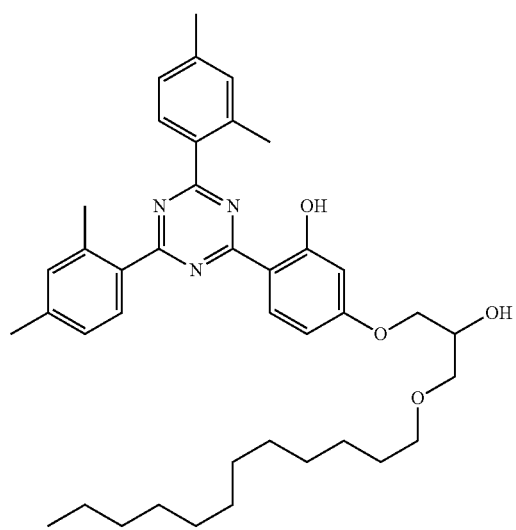 [SMILES: CCCCCCCCCCCCOCC(O)COc1ccc(-c2nc(-c3ccc(C)cc3C)nc(-c3ccc(C)cc3C)n2)c(O)c1]
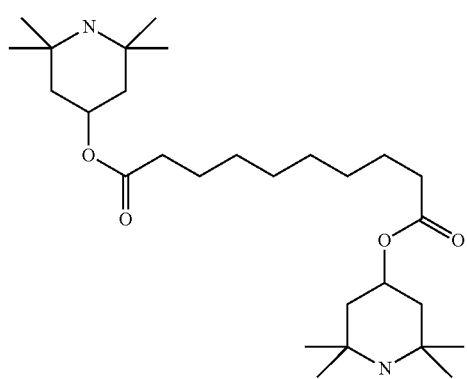

TABLE D-continued
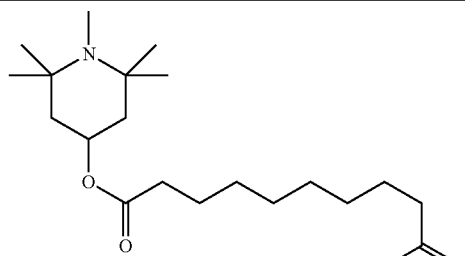
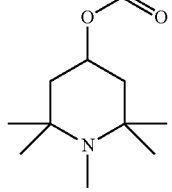
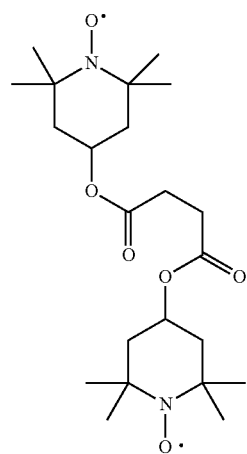
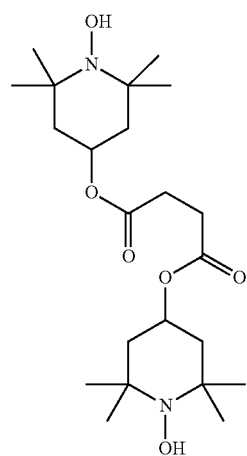
Stabilisers which can be added, for example, to the mixtures according to the
TABLE E
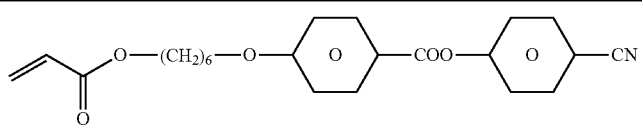

TABLE E-continued
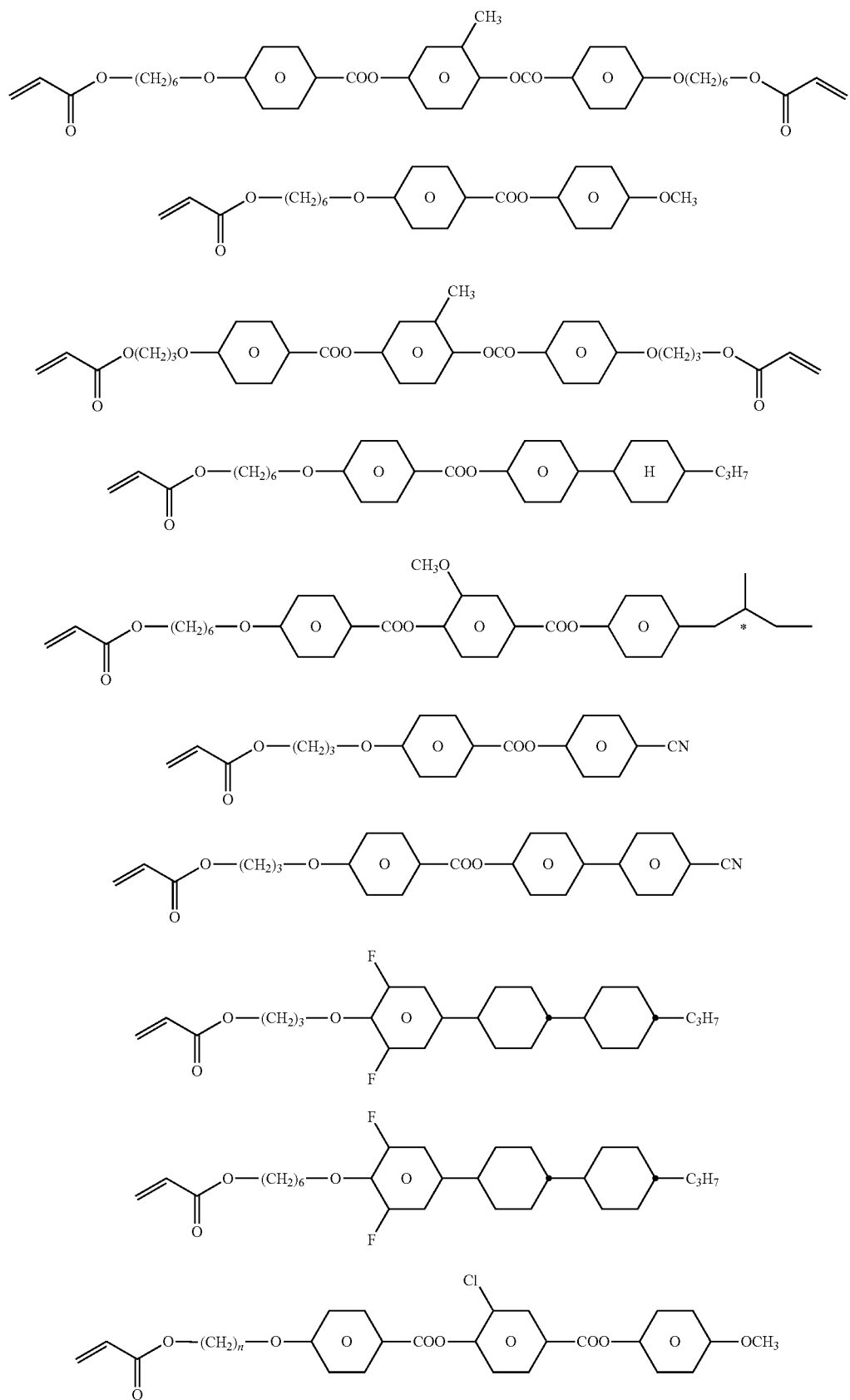

TABLE E-continued
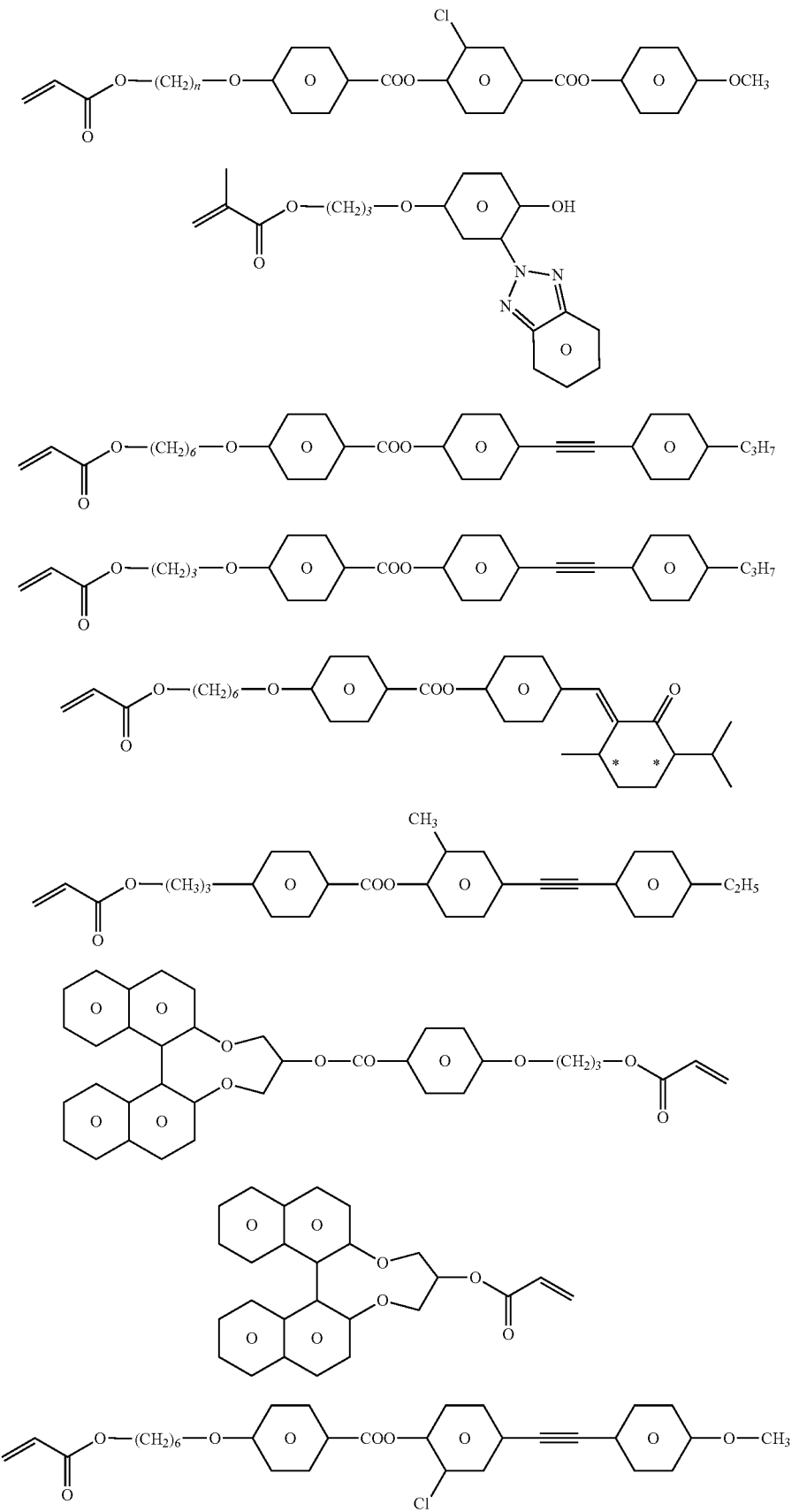

TABLE E-continued
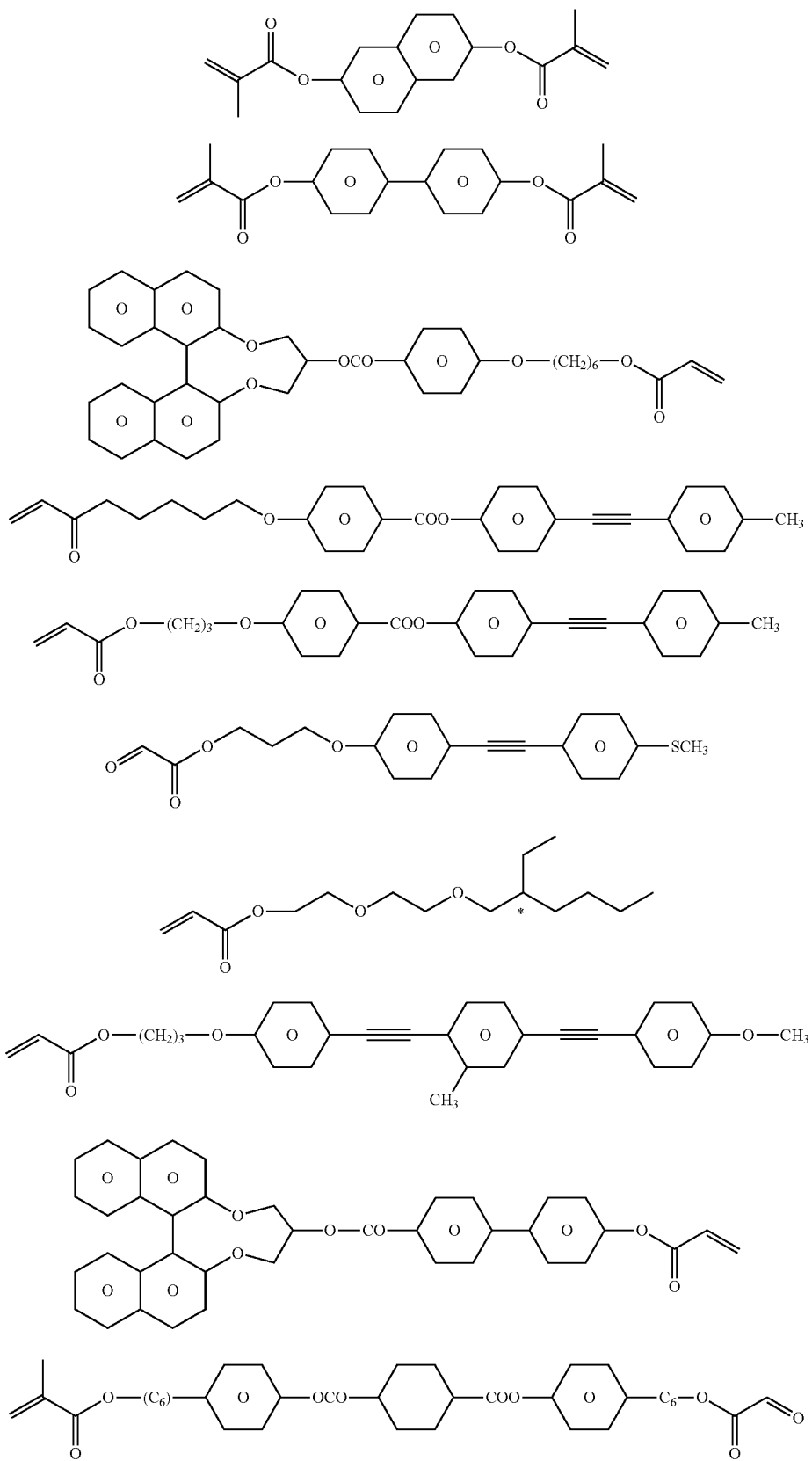

TABLE E-continued
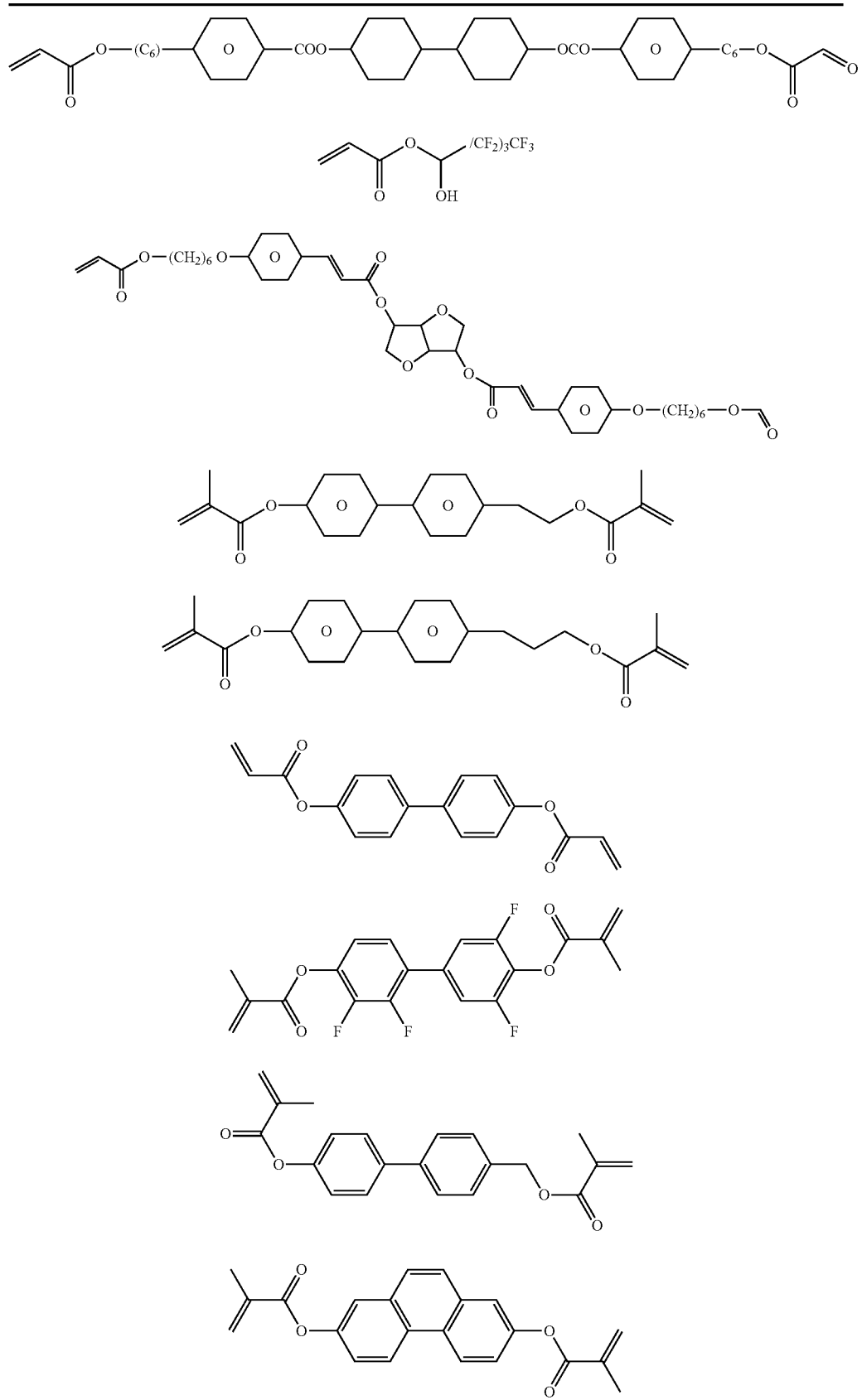

TABLE E-continued

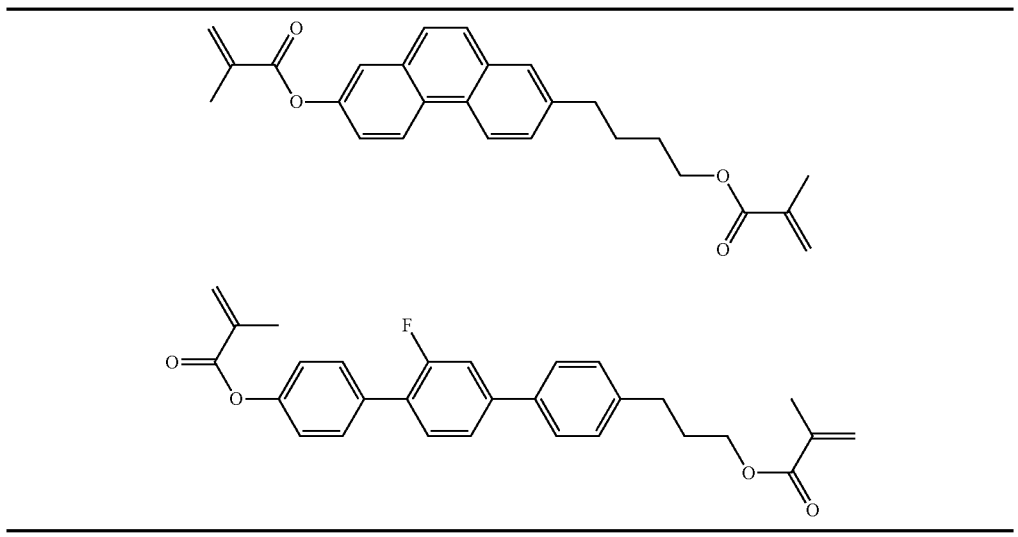

Polymerisable compounds which can be added, for example, to the mixtures according to the invention in amounts of 0-10% by weight are indicated below.

The following examples are intended to explain the invention without limiting it.

Above and below, percentages denote percent by weight. All temperatures are indicated in degrees Celsius. m.p. denotes melting point, cl.p.=clearing point. Furthermore, C=crystalline state, N=nematic phase, S=smectic phase and I=isotropic phase. The numbers between these symbols represent the transition temperatures. Furthermore, $\Delta n$ denotes the optical anisotropy at 589 nm and 20° C.), $\gamma_1$ denotes the rotational viscosity (mPa·s) at 20° C., $V_{10}$ denotes the voltage (V) for 10% transmission (viewing angle perpendicular to the plate surface), (threshold voltage), $V_{90}$ denotes the voltage (V) for 90% transmission (viewing angle perpendicular to the plate surface), $\Delta\epsilon$ denotes the dielectric anisotropy at 20° C. and 1 kHz ($\Delta\epsilon=\epsilon_\parallel-\epsilon_\perp$, where $\epsilon_\parallel$ denotes the dielectric constant parallel to the longitudinal axes of the molecule and $\epsilon_\perp$ denotes the dielectric constant perpendicular thereto).

The electro-optical data are measured in a TN cell at the 1st minimum (i.e. at a d·$\Delta n$ value of 0.5 μm) at 20° C., unless expressly indicated otherwise. The optical data are measured at 20° C., unless expressly indicated otherwise. All physical properties are determined in accordance with "Merck Liquid Crystals, Physical Properties of Liquid Crystals" Status November 1997, Merck KGaA, Germany, and apply for a temperature of 20° C., unless explicitly indicated otherwise.

EXAMPLE 1

A nematic mixture M1 having the following physical properties and the following composition is prepared.

| CC-3-V | 27.00% | T(N, I) [° C.]: | 96.0 |
|---|---|---|---|
| CC-3-V1 | 12.00% | | |
| CCP-30CF3 | 7.00% | $\Delta n$ [589 nm, 20° C.] | 0.109 |
| CCQU-3-F | 6.00% | $\Delta\epsilon$ [kHz, 20° C.]: | +19.0 |
| APUQU-2-F | 10.00% | $\gamma_1$ [mPa·s, 20° C.]: | 117 |
| APUQU-3-F | 10.00% | $K_1$ [20° C.]: | 14.2 |
| PGUQU-3-F | 3.00% | $K_3$ [20° C.]: | 16.5 |

-continued

| PGUQU-4-F | 7.00% | $V_0$ [V]: | 0.91 |
|---|---|---|---|
| CDUQU-5-F | 11.00% | | |
| DPGU-4-F | 7.00% | | |

An IPS display containing mixture M1 has adequate contrast.

EXAMPLE 2

A nematic mixture M2 having the following physical properties and the following composition is prepared.

| CC-3-V | 26.00% | T(N, I) [° C.]: | 98.0 |
|---|---|---|---|
| CC-3-V1 | 11.00% | | |
| CCP-30CF3 | 9.00% | $\Delta n$ [589 nm, 20° C.] | 0.109 |
| CCQU-3-F | 7.00% | $\Delta\epsilon$ [kHz, 20° C.]: | +19.0 |
| APUQU-2-F | 10.00% | $\gamma_1$ [mPa·s, 20° C.]: | 121 |
| APUQU-3-F | 10.00% | $K_1$ [20° C.]: | 14.5 |
| PGUQU-3-F | 3.00% | $K_3$ [20° C.]: | 16.6 |
| PGUQU-4-F | 6.00% | $V_0$ [V]: | 0.92 |
| CDUQU-5-F | 11.00% | | |
| DPGU-4-F | 7.00% | | |

An IPS display containing mixture M2 has adequate contrast.

EXAMPLE 3

A nematic mixture M3 having the following physical properties and the following composition is prepared.

| CC-3-V | 35.00% | T(N, I) [° C.]: | 90.0 |
|---|---|---|---|
| CC-3-V1 | 10.00% | $\Delta n$ [589 nm, 20° C.] | 0.106 |
| CCP-30CF3 | 2.00% | $\Delta\epsilon$ [kHz, 20° C.]: | +7.4 |
| CCP-V-1 | 11.00% | $\gamma_1$ [mPa·s, 20° C.]: | 71 |
| CCP-V2-1 | 6.00% | $K_1$ [20° C.]: | 14.6 |
| CPGP-5-2 | 1.00% | $K_3$ [20° C.]: | 15.8 |
| DPGU-4-F | 8.00% | $V_0$ [V]: | 1.48 |
| PGP-2-2V | 7.00% | | |
| PUQU-3-F | 12.00% | | |
| CDUQU-3-F | 8.00% | | |

An IPS display containing mixture M3 has adequate contrast.

EXAMPLE 4

A nematic mixture M4 having the following physical properties and the following composition is prepared.

| | | | |
|---|---|---|---|
| CC-3-V | 32.00% | T(N, I) [° C.]: | 93.5 |
| CC-3-V1 | 12.00% | Δn [589 nm, 20° C.] | 0.085 |
| CCP-V-1 | 6.50% | Δε [kHz, 20° C.]: | +10.1 |
| PP-1-2V1 | 2.50% | γ$_1$ [mPa · s, 20° C.]: | 96 |
| CCP-30CF3 | 6.00% | K$_1$ [20° C.]: | 14.2 |
| APUQU-2-F | 7.50% | K$_3$ [20° C.]: | 17.1 |
| APUQU-3-F | 8.00% | V$_0$ [V]: | 1.25 |
| PGUQU-3-F | 3.00% | | |
| PGUQU-4-F | 8.50% | | |
| DPGU-4-F | 6.00% | | |
| CDUQU-5-F | 8.00% | | |

An IPS display containing mixture M4 has adequate contrast.

The invention claimed is:
1. A medium comprising
at least one compound of formula I,

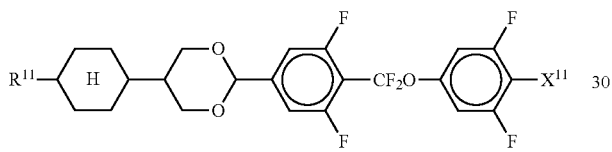

in which
R$^{11}$ denotes an unsubstituted alkyl radical having 1 to 15 C atoms, in which one or more CH$_2$ groups are each optionally replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another,
X$^{11}$ denotes F, Cl, CN or an alkyl radical having 1 to 15 C atoms which is mono- or polysubstituted by F, in which one or more CH$_2$ groups are each optionally replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another,
at least one compound of formula I*,

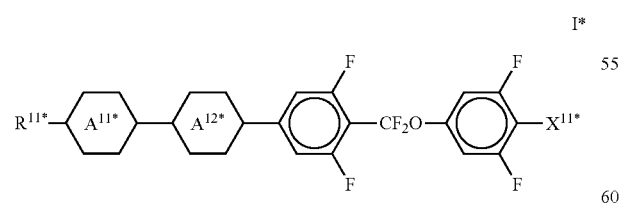

in which
R$^{11}$* denotes an unsubstituted alkyl radical having 1 to 15 C atoms, in which one or more CH$_2$ groups are each optionally replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another,
A$^{11}$*, A$^{12}$* each, independently of one another, denotes

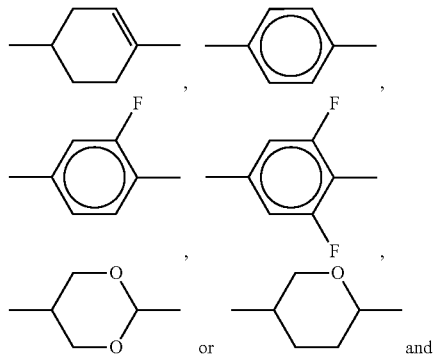

X$^{11}$* denotes F, Cl, CN or alkyl, alkenyl, alkenyloxy, alkylalkoxy or alkoxy having 1 to 3 C atoms, which is mono- or polysubstituted by F,
at least one compound of formula II,

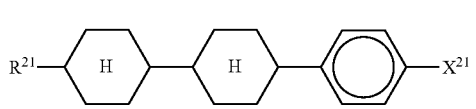

in which
R$^{21}$ denotes an alkyl or alkenyl radical having up to 15 C atoms which is unsubstituted, or monosubstituted by CN or CF$_3$ or at least monosubstituted by halogen, in which one or more CH$_2$ groups are each optionally replaced by —O—, —S—,

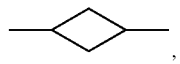

—C≡C—, —OC—O—, or —O—CO— in such a way that O atoms are not linked directly to one another, and
X$^{21}$ denotes F, Cl, CN, a halogenated alkyl, or alkoxy radical having 1 to 6 C atoms or a halogenated alkenyl radical having 2 to 6 C atoms,
and at least one compound of formula III,

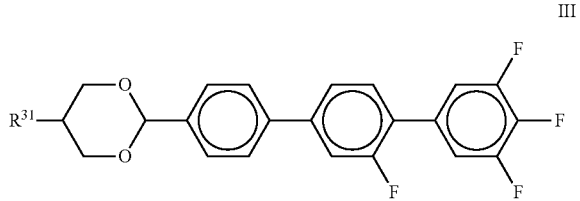

in which
R$^{31}$ denotes an alkyl or alkenyl radical having up to 15 C atoms which is unsubstituted, monosubstituted by CN or CF$_3$ or at least monosubstituted by halogen, in which one or more CH$_2$ groups are each optionally replaced by —O—, —S—, —C≡C—, —CH=CH—, —OC—

O— or —O—CO— in such a way that O atoms are not linked directly to one another.

2. The medium according to claim 1, wherein the at least one compound of formula II is a compound of formulae IIa to IIe,

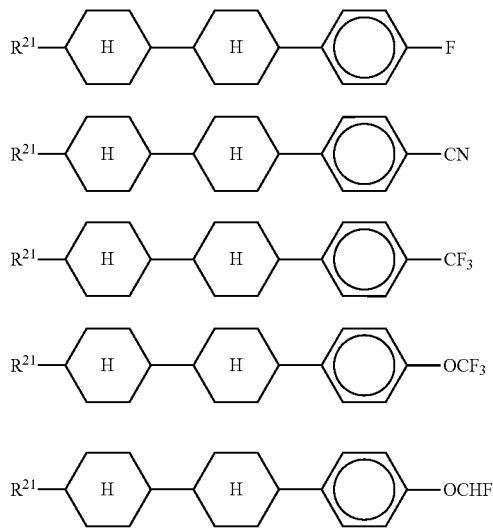

in which

R$^{21}$ denotes an alkyl or alkenyl radical having up to 15 C atoms which is unsubstituted, or monosubstituted by CN or CF$_3$ or at least monosubstituted by halogen, in which one or more CH$_2$ groups are each optionally replaced by —O—, —S—,

—C≡C—, —OC—O—, or —O—CO— in such a way that O atoms are not linked directly to one another.

3. The medium according to claim 1, wherein R$^{11}$* denotes an unsubstituted straight-chain alkyl radical having 2 to 7 C atoms, in which one or more CH$_2$ groups are each optionally replaced, independently of one another, by —CH=CH—, —CF=CF—, —CF=CH—, —CH=CF—, —(CO)O—, —O(CO)—, —(CO)— or —O— in such a way that O atoms are not linked directly to one another.

4. The medium according to claim 1, further comprising at least one compound of formula IV,

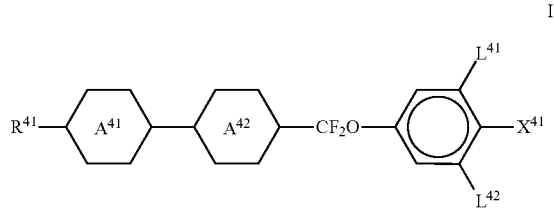

in which

R$^{41}$ denotes an unsubstituted alkyl radical having 1 to 15 C atoms, in which one or more CH$_2$ groups are each optionally replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, A$^{41}$, A$^{42}$ each, independently of one another, denote

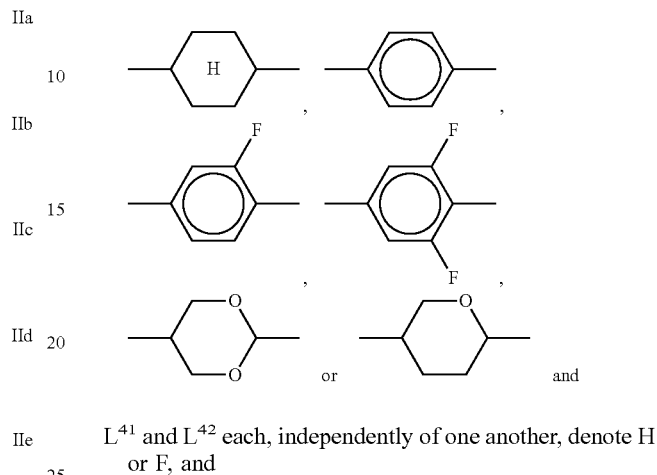

L$^{41}$ and L$^{42}$ each, independently of one another, denote H or F, and

X$^{41}$ denotes F, Cl, CN, or alkyl, alkenyl, alkenyloxy, alkylalkoxy or alkoxy having 1 to 3 C atoms, which is mono- or polysubstituted by F.

5. The medium according to claim 1, further comprising at least one compound of formula V,

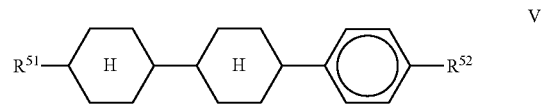

in which

R$^{51}$ and R$^{52}$ each, independently of one another, denote an unsubstituted, alkyl or alkenyl radical having up to 15 C atoms, in which one or more CH$_2$ groups are each optionally replaced by —O—, —S—,

—C≡C—, —OC—O—, or —O—CO— in such a way that O atoms are not linked directly to one another.

6. The medium according to claim 1, further comprising at least one compound of formula VI,

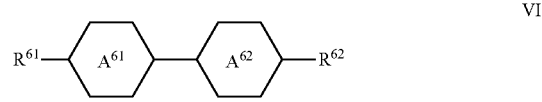

in which

R$^{61}$ denotes an alkyl, or alkoxy radical having 1 to 10 C atoms or an alkenyl radical having 2 to 10 C atoms, R$^{62}$ denotes an alkyl, or alkoxy radical having 1 to 10 C atoms or an alkenyl radical having 2 to 10 C atoms, or F, Cl, CN, a halogenated alkyl, or alkoxy radical having 1 to 6 C atoms or a halogenated alkenyl radical having 2 to 6 C atoms, $A^{61}$ and $A^{62}$ denote

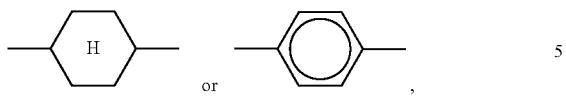

$X^{61}$ denotes F, Cl, CN, a halogenated alkyl, or alkoxy radical having 1 to 6 C atoms or a halogenated alkenyl radical having 2 to 6 C atoms.

7. A process for preparing the medium according to claim 1, comprising mixing together one or more compounds of formula I, I* II and III, and optionally one or more further mesogenic compounds and/or one or more additives.

8. An electro-optical display containing a medium according to claim 1.

9. An electro-optical display having a re-alignment layer for the re-alignment of the liquid crystals whose field has a component for the re-alignment, parallel to the liquid-crystal layer, which contains, as dielectric, a liquid-crystalline medium according to claim 1.

* * * * *